(12) United States Patent
Onggosanusi et al.

(10) Patent No.: US 10,512,046 B2
(45) Date of Patent: Dec. 17, 2019

(54) METHOD AND APPARATUS FOR MEASUREMENT REFERENCE SIGNAL AND SYNCHRONIZATION

(71) Applicant: Samsung Electronics Co., Ltd, Suwon-si (KR)

(72) Inventors: Eko Onggosanusi, Coppell, TX (US); Younsun Kim, Seongnam-si (KR); Hongbo Si, Garland, TX (US); Md Saifur Rahman, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/618,014

(22) Filed: Jun. 8, 2017

(65) Prior Publication Data
US 2017/0359791 A1    Dec. 14, 2017

Related U.S. Application Data

(60) Provisional application No. 62/347,958, filed on Jun. 9, 2016, provisional application No. 62/372,602, filed on Aug. 9, 2016.

(51) Int. Cl.
*H04W 56/00* (2009.01)
*H04L 5/00* (2006.01)

(52) U.S. Cl.
CPC ....... *H04W 56/0005* (2013.01); *H04L 5/0023* (2013.01); *H04L 5/0035* (2013.01);
(Continued)

(58) Field of Classification Search
CPC ............. H04W 56/0005; H04L 5/0023; H04L 5/0035; H04L 5/0048; H04L 5/0053; H04L 5/0073; H04L 5/0094
(Continued)

(56) References Cited

U.S. PATENT DOCUMENTS

2011/0190011 A1*  8/2011  Choi ................... H04L 5/0007
                                                              455/466
2011/0274102 A1* 11/2011  Kim .................... H04L 1/0072
                                                              370/350
(Continued)

FOREIGN PATENT DOCUMENTS

WO        2015130029 A1    9/2015

OTHER PUBLICATIONS

International Search Report and Written Opinion for International Application No. PCT/KR2017/006026, dated Sep. 19, 2017 (11 pages).
(Continued)

*Primary Examiner* — Chi Tang P Cheng

(57) ABSTRACT

Methods and apparatuses for measurement reference signals and synchronization signals. A user equipment (UE) includes a transceiver and a processor operably connected to the transceiver. The transceiver is configured to receive a primary synchronization signal (PSS), a secondary synchronization signal (SSS), and a primary broadcast channel (PBCH). The processor is configured to decode cell identification information from at least the PSS and the SSS and to decode a master information block (MIB) from the PBCH. The PSS, the SSS, and the PBCH are time-division multiplexed. A same set of sequences are used for the PSS and the SSS for different carrier frequencies and different sub-carrier spacing values.

17 Claims, 14 Drawing Sheets

(52) U.S. Cl.
CPC .......... *H04L 5/0048* (2013.01); *H04L 5/0053* (2013.01); *H04L 5/0073* (2013.01); *H04L 5/0094* (2013.01)

(58) Field of Classification Search
USPC .......................................................... 370/350
See application file for complete search history.

(56) References Cited

U.S. PATENT DOCUMENTS

| | | | |
|---|---|---|---|
| 2013/0195043 A1 | 8/2013 | Chen et al. | |
| 2014/0018087 A1* | 1/2014 | McNamara | H04L 5/0039 455/450 |
| 2014/0141792 A1* | 5/2014 | Larsson | H04W 64/00 455/452.1 |
| 2014/0226649 A1 | 8/2014 | Webb et al. | |
| 2014/0254452 A1* | 9/2014 | Golitschek Edler Von Elbwart | H04W 52/0216 370/311 |
| 2015/0230261 A1 | 8/2015 | Lo et al. | |
| 2018/0062776 A1* | 3/2018 | Teshima | H04W 52/02 |
| 2018/0212698 A1* | 7/2018 | Sun | H04L 5/0053 |

OTHER PUBLICATIONS

Sharp, "Diffferent CP length and different subcarrier spacing of in-band operation", R1-157118, 3GPP TSG RAN WG1 Meeting #83, Anaheim, USA, Nov. 15-22, 2015 (5 pages).
3GPP TS 36.211 V12.4.0 (Dec. 2014) Technical Specification 3rd Generation Partnership Project; Technical Specification Group Radio Access Network; Evolved Universal Terrestrial Radio Access (E-UTRA); Physical channels and modulation (Release 12) Dec. 2014—124 Pages.
3GPP TS 36.212 V12.3.0 (Dec. 2014) Technical Specification 3rd Generation Partnership Project; Technical Specification Group Radio Access Network; Evolved Universal Terrestrial Radio Access (E-UTRA); Multiplexing and channel coding (Release 12)—Dec. 2014—89 Pages.
3GPP TS 36.213 V12.4.0 (Dec. 2014) Technical Specification 3rd Generation Partnership Project; Technical Specification Group Radio Access Network; Evolved Universal Terrestrial Radio Access (E-UTRA); Physical layer procedures (Release 12)—Dec. 2014—225 Pages.
3GPP TS 36.321 V12.4.0 (Dec. 2014) Technical Specification 3rd Generation Partnership Project; Technical Specification Group Radio Access Network; Evolved Universal Terrestrial Radio Access (E-UTRA); Medium Access Control (MAC) protocol specification Release 12)—Dec. 2014—60 Pages.
3GPP TS 36.331 V12.4.0 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12)—Dec. 2014—410 Pages.
3GPP TR 22.891 V1.2.0 (Nov. 2015) Technical Report 3rd Generation Partnership Project; Technical Specification Group Services and System Aspects; Feasibility Study on New Services and Markets Technology Enablers; Stage 1 (Release 14)—Nov. 2015—96 Pages.
Extended European Search Report regarding Application No. 17810584.7, dated May 28, 2019, 8 pages.
Huawei, "SCH design for dedicated MBMS", 3GPP TSG RAN WG1 meeting #52bis, R1-081392, Mar.-Apr. 2008, 6 pages.
Samsung, "Cell search for NR: design consideration", 3GPP TSG RAN WG1 #85, R1-163997, May 2016, 6 pages.

\* cited by examiner

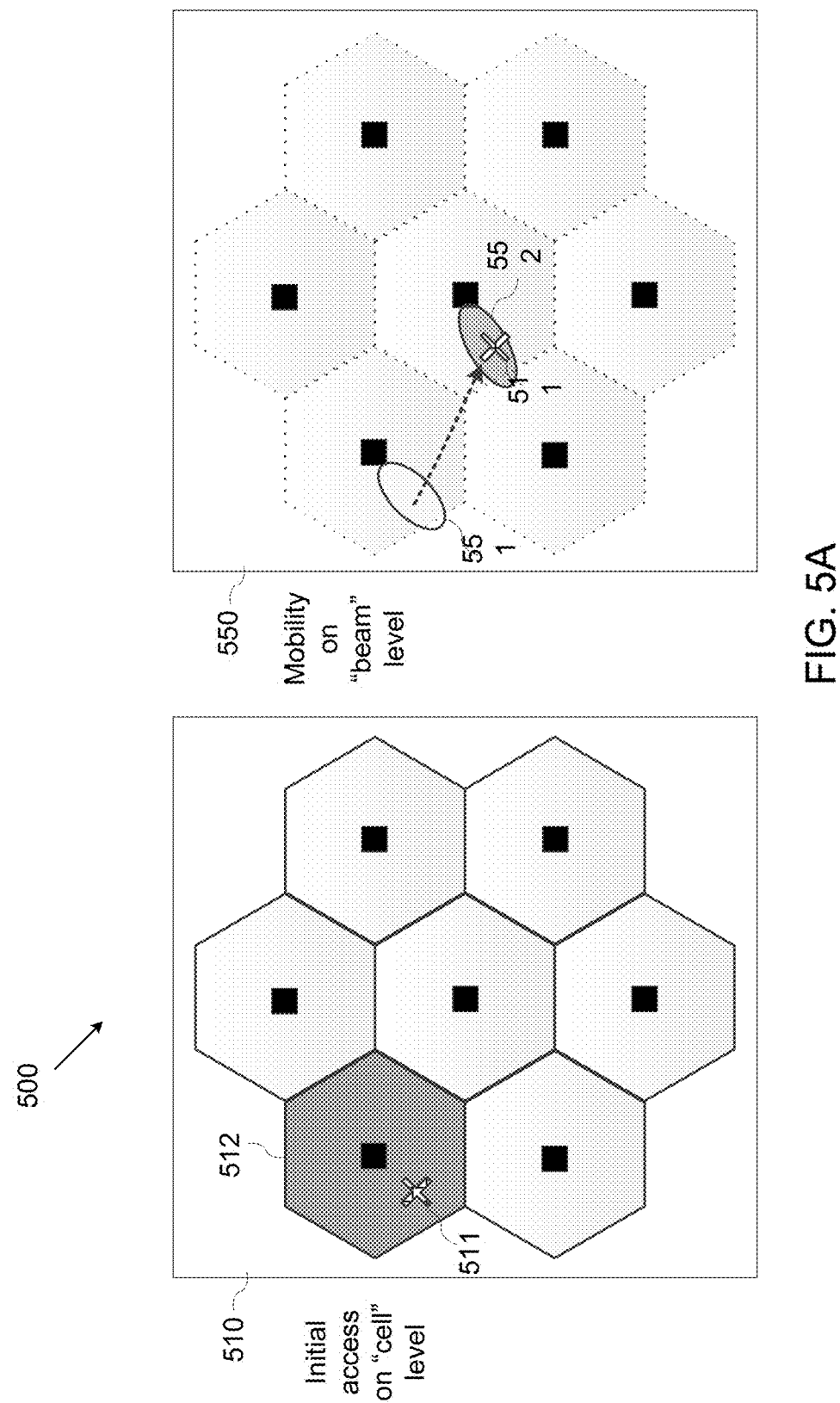

METHOD AND APPARATUS FOR MEASUREMENT REFERENCE SIGNAL AND SYNCHRONIZATION

CROSS-REFERENCE TO RELATED APPLICATIONS AND CLAIM OF PRIORITY

This application claims priority under 35 U.S.C. § 119(e) to U.S. Provisional Patent Application Ser. No. 62/347,958 filed Jun. 9, 2016; and U.S. Provisional Patent Application Ser. No. 62/372,602 filed Aug. 9, 2016. The above-identified provisional patent applications are hereby incorporated by reference in their entirety.

TECHNICAL FIELD

The present disclosure relates generally to methods for measurement reference signals and synchronization signals. Such methods can be used when a user equipment attempts to initiate initial access, perform neighboring cell search, or radio resource management.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry that accommodates a large number of antenna elements.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive a primary synchronization signal (PSS), a secondary synchronization signal (SSS), and a primary broadcast channel (PBCH). The processor is configured to decode cell identification information from at least the PSS and the SSS and to decode a master information block (MIB) from the PBCH. The PSS, the SSS, and the PBCH are time-division multiplexed. A same set of sequences are used for the PSS and the SSS for different carrier frequencies and different sub-carrier spacing values In another embodiment, a base station (BS) is provided. The BS includes a processor and a transceiver operably connected to the processor. The processor is configured to encode cell identification information in at least a PSS and a SSS and encode a MIB in a PBCH. The transceiver is configured to transmit the PSS, the SSS, and the PBCH. The PSS, the SSS, and the PBCH are time-division multiplexed. A same set of sequences are used for the PSS and the SSS for different carrier frequencies and different sub-carrier spacing values.

In another embodiment, a method for operating a UE is provided. The method includes receiving, by the UE, a PSS, a SSS, and a PBCH. The method also includes decoding cell identification information from at least the PSS and the SSS and decoding a MIB from the PBCH. The PSS, the SSS, and the PBCH are time-division multiplexed. A same set of sequences are used for the PSS and the SSS for different carrier frequencies and different sub-carrier spacing values.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of that is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in that like reference numerals represent like parts:

FIG. 5A illustrates an example two-level radio resource management according to an embodiment of the present disclosure;

DETAILED DESCRIPTION

Figure 1:
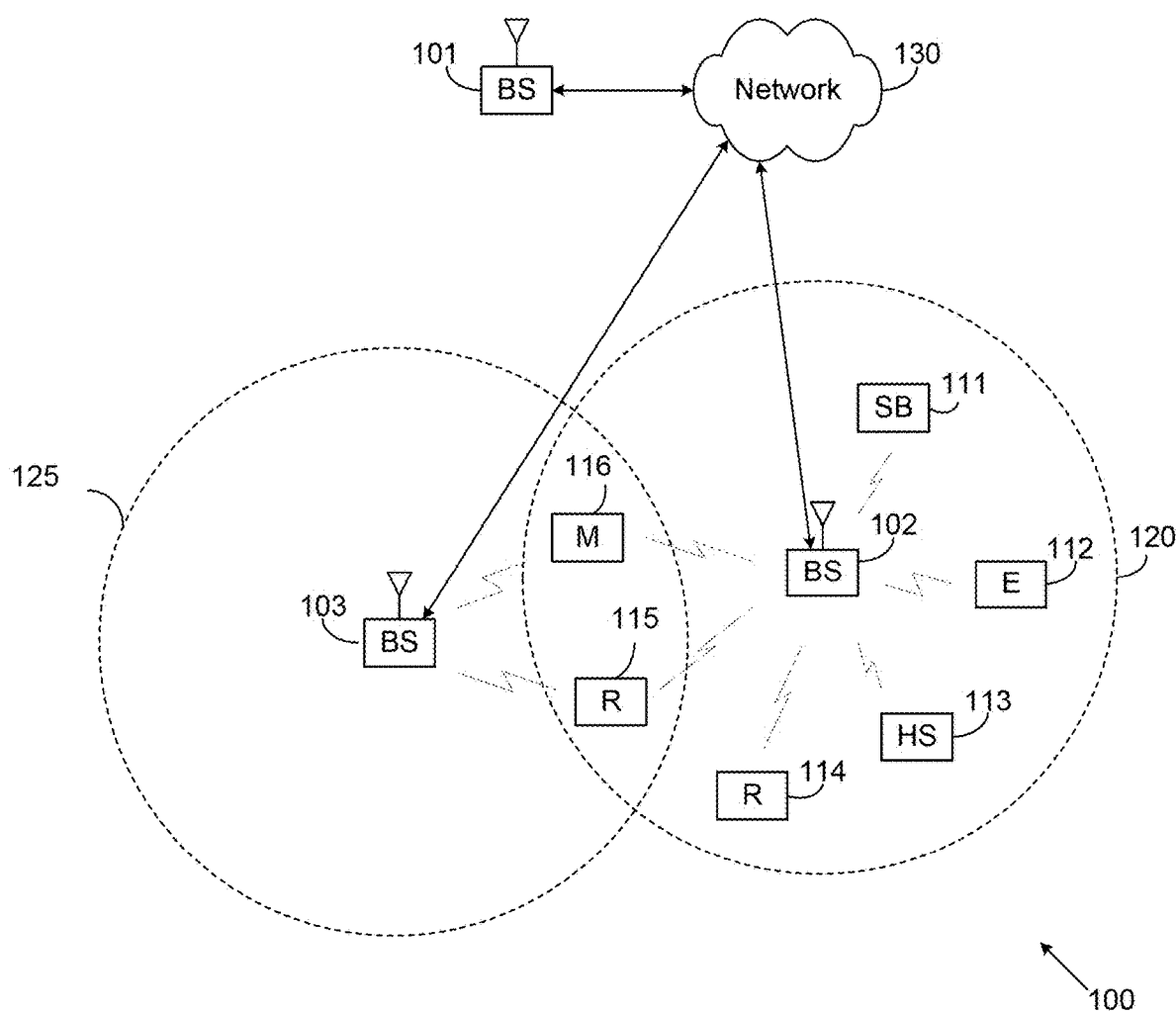
FIG. 1 illustrates an example wireless network according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, that can be located in a small business (SB); a UE 112, that can be located in an enterprise (E); a UE 113, that can be located in a WiFi hotspot (HS); a UE 114, that can be located in a first residence (R); a UE 115, that can be located in a second residence (R); and a UE 116, that can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, that are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive transmission scheme or precoding information signaled in an uplink grant and transmit accordingly.

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
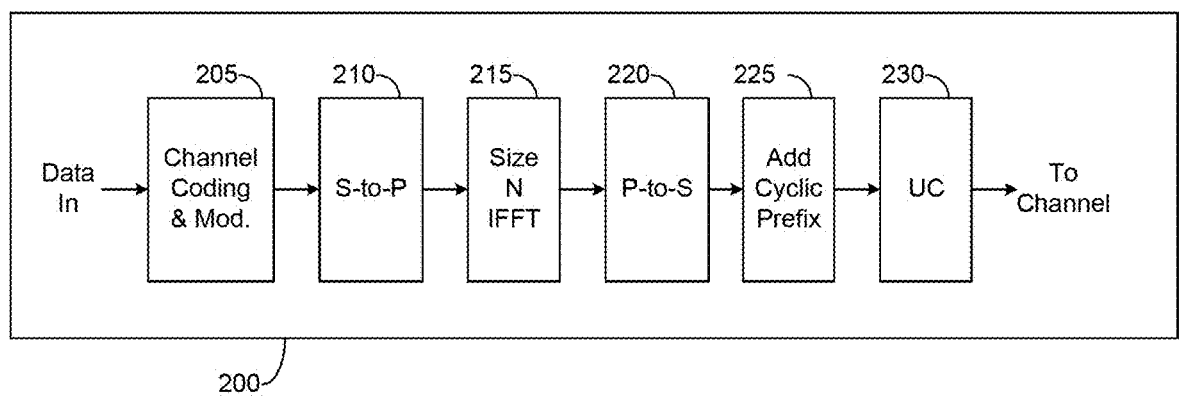
FIGS. 2A and 2B illustrate example wireless transmit and receive paths according to various embodiments of the present disclosure.
Figure 2B:
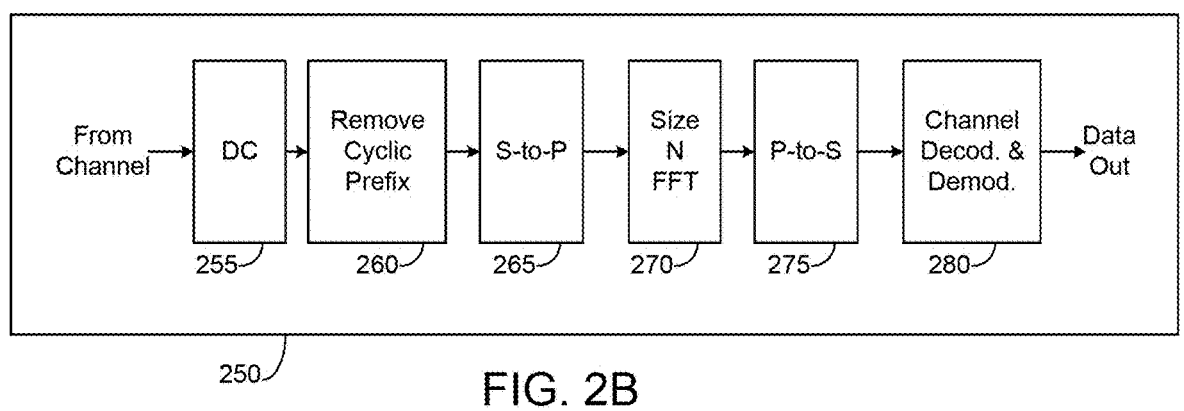

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to receive at least one measurement reference signal (RS) and at least one synchronization signal (SS) accordingly as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
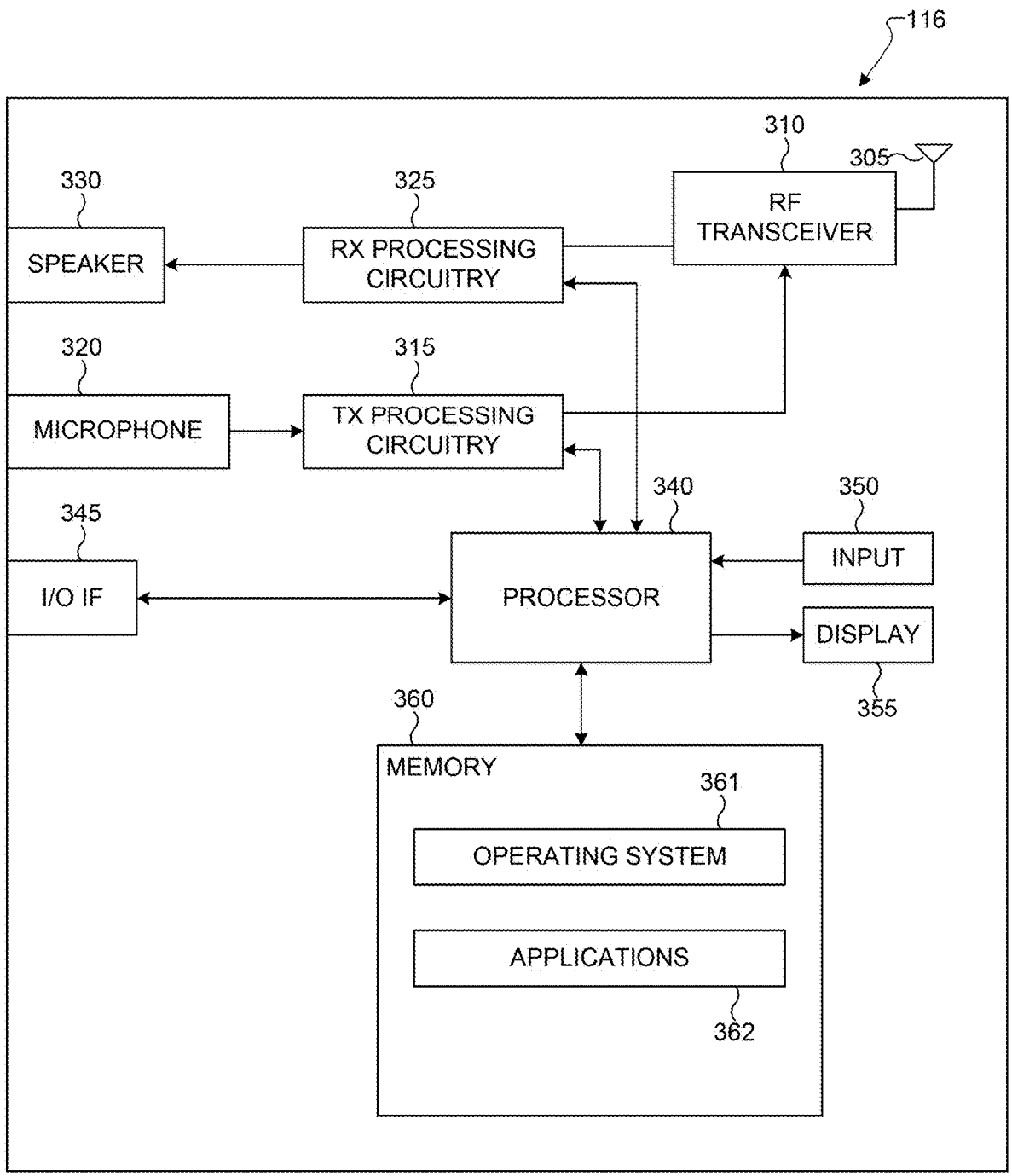
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, that provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
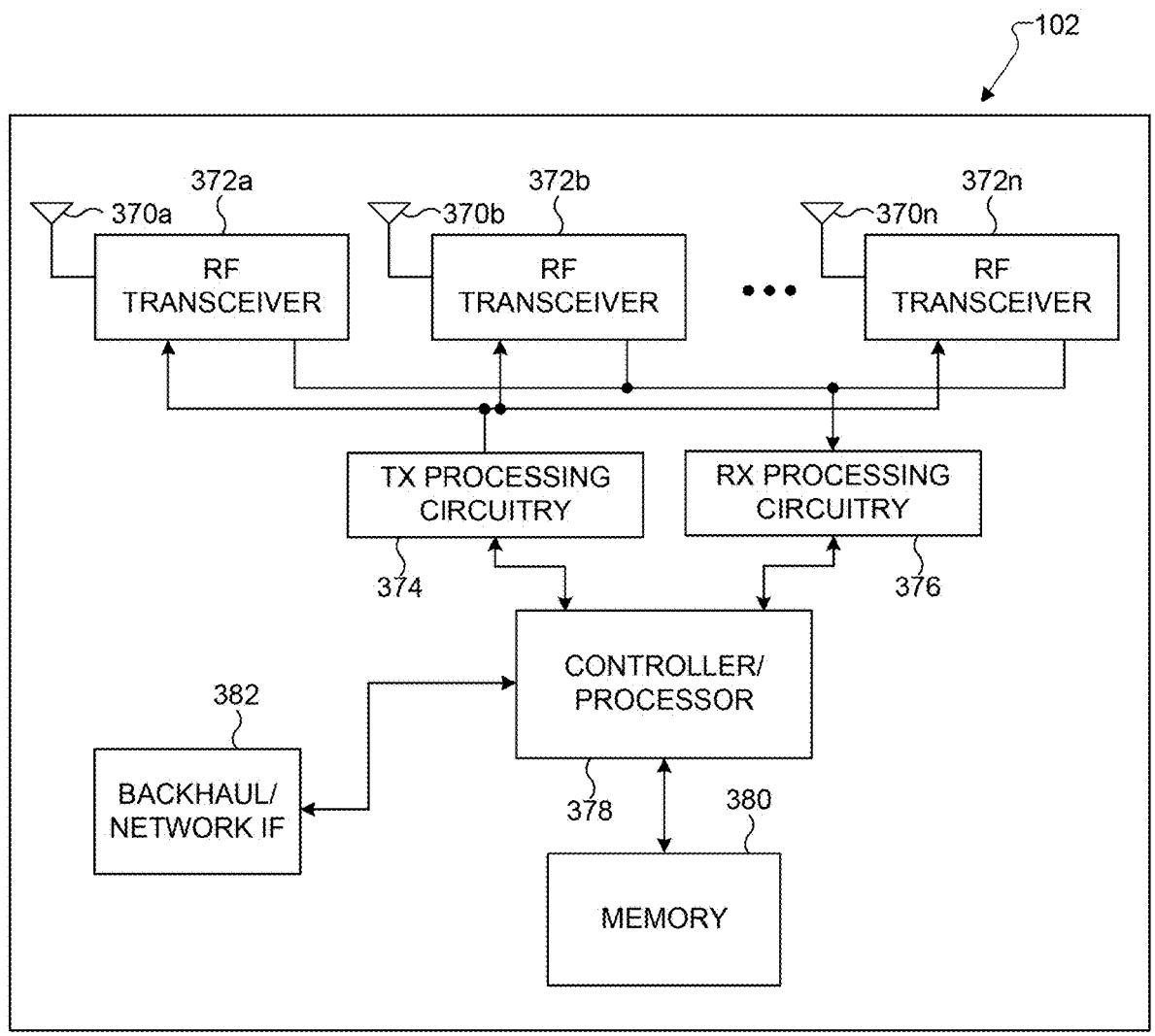
FIG. 3B illustrates an example base station (BS) according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of an gNB. gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, that generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G or new radio access technology or NR, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) perform transmission of at least one measurement reference signal (RS) and at least one synchronization signal (SS).

Although FIG. 3B illustrates one example of an gNB 102, various changes can be made to FIG. 3B. For example, the gNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports that enable an gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
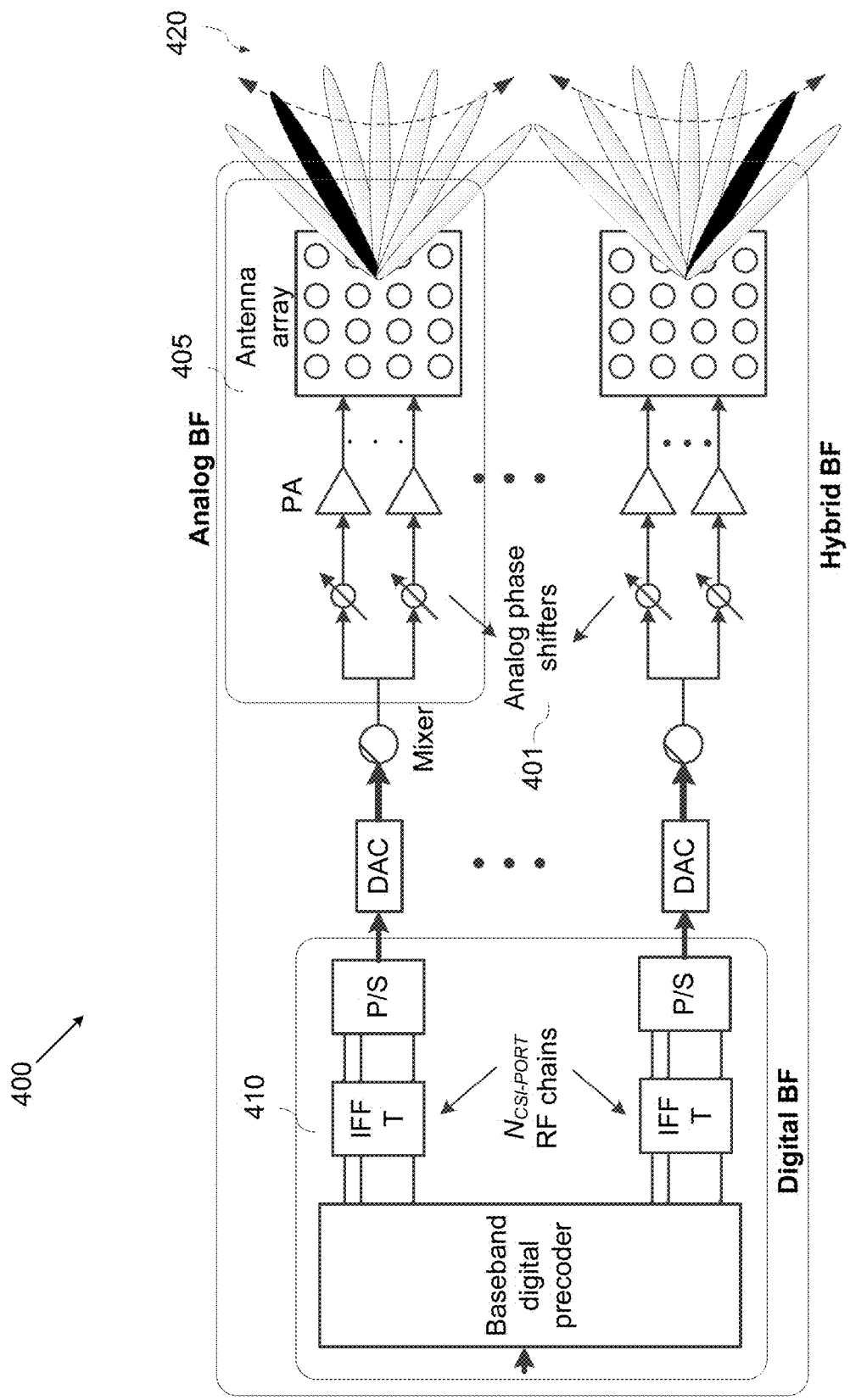
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports—that can correspond to the number of digitally precoded ports—tends to be limited due to hardware constraints (such as the feasibility to install a large number of ADCs/DACs at mmWave frequencies) as illustrated in embodiment 400 of FIG. 4. In this case, one CSI-RS port is mapped onto a large number of antenna elements that can be controlled by a bank of analog phase shifters 401. One CSI-RS port can then correspond to one sub-array that produces a narrow analog beam through analog beamforming 405. This analog beam can be configured to sweep across a wider range of angles (420) by varying the phase shifter bank across symbols or subframes. The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is an important factor. For this reason, three types of CSI reporting mechanism corresponding to three types of CSI-RS measurement behavior are supported in Rel.13 LTE: 1) 'CLASS A' CSI reporting that corresponds to non-precoded CSI-RS, 2) 'CLASS B' reporting with K=1 CSI-RS resource that corresponds to UE-specific beamformed CSI-RS, 3) 'CLASS B' reporting with K>1 CSI-RS resources that corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (that includes multiple ports). Here, (at least at a given time/frequency) CSI-RS ports have narrow beam widths and hence not cell wide coverage, and (at least from the gNB perspective) at least some CSI-RS port-resource combinations have different beam directions.

In scenarios where DL long-term channel statistics can be measured through UL signals at a serving gNB, UE-specific BF CSI-RS can be readily used. This is typically feasible when UL-DL duplex distance is sufficiently small. When this condition does not hold, however, some UE feedback is used for the gNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In 3GPP LTE, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs. For instance, this can be done by measuring their Reference Signal Received Powers (RSRPs). For next generation cellular systems such as 3GPP NR (new radio access or interface), efficient and unified radio resource acquisition or tracking mechanism that works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework that accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 4) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 4), repetition, diversity, and/or multi-TRP transmission. For mMTC where transmission bandwidth is small, time-domain repetition can be used to ensure sufficient coverage.

One important component to RRM and mobility management is measurement RS design. In 3GPP LTE, various types of measurement RS are specified—such as CRS, PRS, and CSI-RS—that can be used to measure different entities (RSRP, positioning, CSI). For RRM and mobility management, Rel.8 CRS is the primary RS. All these RSs are designed assuming a single-cell ("cell-specific") paradigm. Thus, they may not be suitable for the next generation cellular systems such as NR.

Therefore, there is a need for an access, radio resource, and mobility management framework that accommodates various use cases, network topologies, and implementation schemes. In addition, there is also a need for a measurement RS design that enables efficient radio resource acquisition and tracking and aids the proposed access, radio resource, and mobility management framework. There is also a need for designing synchronization signals (along with their associated UE procedures) and primary broadcast channel that carries broadcast information (termed the Master Information Block or MIB).

The present disclosure includes at least five components for enabling measurement reference signal (measurement RS) and synchronization signal (SS). A first component includes embodiments for initial access, radio resource, and mobility management procedures. A second component includes embodiments pertaining to measurement RS. A third component includes embodiments for the contents of synchronization signals (SSs) and primary broadcast channel (PBCH). A fourth component includes embodiments for synchronization signals (SSs). A fifth component includes embodiments for primary broadcast channel (PBCH).

Names or terms used to represent functionality are example and can be substituted with other names or labels without changing the substance of this embodiment.

Although example descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM). In the present disclosure, numerology refers to a set of signal parameters that can include subframe/slot duration, sub-carrier spacing, cyclic prefix length, transmission bandwidth, or any combination of the these signal parameters. For brevity, both FDD and TDD are considered as the duplex method for both DL and UL signaling.

The present disclosure covers several components that can be used in conjunction or in combination with one another, or can operate as standalone schemes.

For the first component (that is, embodiments for initial access, radio resource, and mobility management procedures), several example embodiments can be described as follows.

In one embodiment, a UE-centric access that utilizes two levels of radio resource entity is described in embodiment 500 of FIG. 5A. These two levels can be termed as "cell" and "beam". These two terms are used for illustrative purposes. Other terms such as radio resource (RR) 1 and 2 can also be used. Additionally, the term "beam" as a radio resource unit is to be differentiated with, for instance, an analog beam used for beam sweeping in FIG. 4. This embodiment is especially relevant for, although not limited to, synchronous network where cells within a network are synchronized in time and frequency within a certain range of values. Furthermore, this embodiment is especially relevant, although not limited to the case, when a TRP utilizes at least one antenna array that can be used for beamforming.

The first RR level (termed "cell") applies when a UE enters a network and therefore is engaged in an initial access procedure. In 510, a UE 511 is connected to cell 512 after performing an initial access procedure that includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 5, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s). The second RR level (termed "beam") applies when a UE is already connected to a cell and hence in the network. In this second level, UE 511 can move within the network without observing cell boundaries as illustrated in embodiment 550. That is, UE mobility is handled on beam level rather than cell level, where one cell can be associated with N beams (N can be 1 or >1). Unlike cell, however, beam is a physical layer entity. Therefore, UE mobility management is handled solely on physical layer—hence requiring physical layer procedure(s) without MAC layer procedure(s).

An example of UE mobility scenario based on the second level RR is given in embodiment 550 of FIG. 5A. After UE 511 is associated with the serving cell 512, UE 511 is further associated with beam 551. This is achieved by acquiring a beam or radio resource (RR) acquisition signal from that the UE can acquire a beam identity or identification. An example of beam or RR acquisition signal is a measurement reference signal (RS). Upon acquiring a beam (or RR) acquisition signal, UE 511 can report a status to the network or an associated TRP. Examples of such report include a measured beam power (or measurement RS power) or a set of at least one recommended beam identity. Based on this report, the network or the associated TRP can assign a beam (as a radio resource) to UE 511 for data and control transmission. When UE 511 moves to another cell, the boundary between the previous and the next cells is neither observed nor visible to UE 511. Instead of cell handover, UE 511 switches from beam 551 to beam 552. Such a seamless mobility is facilitated by the report from UE 511 to the network or associated TRP—especially when UE 511 reports a set of M>1 preferred beam identities by acquiring and measuring M beam (or RR) acquisition signals. Therefore, synchronization signals are acquired only during initial access. Once a UE is connected to the network and associated with a cell, UE mobility is handled on beam level and cell boundaries are no longer observed—thereby attaining the so-called "one cell" or "boundary-less cell" network (from UE perspective). Hence, synchronization signals need no longer be acquired. Instead, beam (RR) acquisition signals (such as measurement RSs) are used for radio resource management (RRM). In other words, cell ID (a MAC layer entity, carried by synchronization signal(s)) is acquired only during initial access whereas "beam ID" (a physical layer entity, carried by beam (RR) acquisition signal such as a measurement RS) is acquired for mobility and/or RRM. Once the UE is in the network, the UE is not required to acquire or monitor cell ID(s) from synchronization signals. Either cell ID(s) become irrelevant for the UE or are signaled to the UE in association with an acquired beam ID.

This, of course, does not preclude some UE implementations that make use of synchronization signals, in addition to beam (RR) acquisition signals, to assist beam (RR) acquisition or tracking for UE mobility.

Figure 5B:
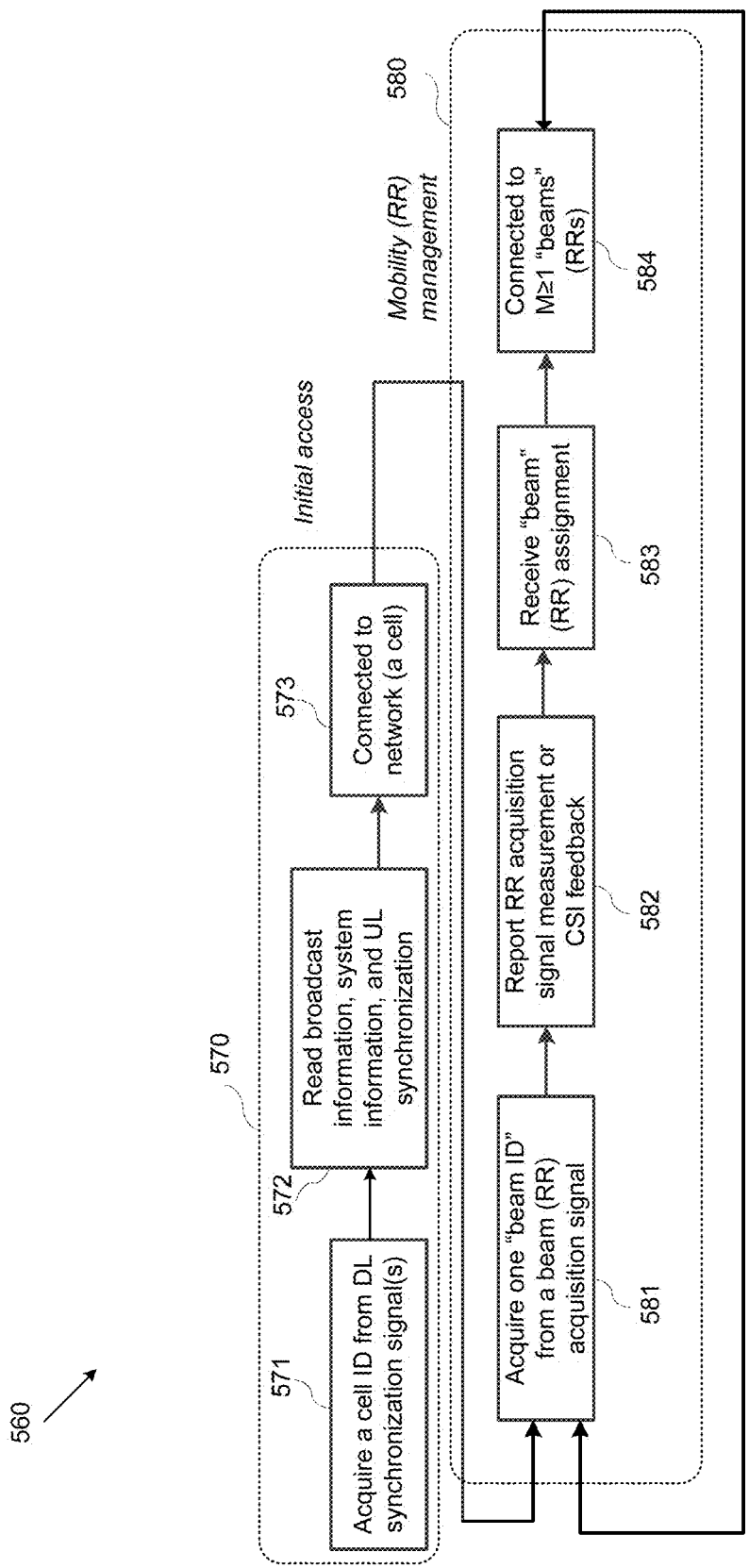
FIG. 5B illustrates an example procedure for initial access and radio resource measurement according to an embodiment of the present disclosure.

The above framework can also be described in embodiment 560 of FIG. 5B where 570 illustrates the aforementioned initial access procedure and 570 the aforementioned mobility or radio resource management from the perspective of a UE. The initial access procedure 570 includes cell ID acquisition from DL synchronization signal(s) 571 as well as retrieval of broadcast information (that can include system information required by the UE to establish DL and UL connections) followed by UL synchronization (that can include random access procedure) 572. Once the UE completes 571 and 572, the UE is connected to the network and associated with a cell 573.

Following the completion of initial access procedure, the UE, possibly mobile, is in an RRM state described in 580. This state includes, first, an acquisition stage 581 where the UE can periodically (repeatedly) attempt to acquire a "beam" or RR ID from a "beam" or RR acquisition signal (such as a measurement RS). The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE. In this case, the UE can be configured with a set of K>1 CSI-RS resources to monitor. Several options are possible for measurement report 582. First, the UE can measure each of the K CSI-RS resources, calculate a corresponding RS power (similar to RSRP or RSRQ in LTE), and report it to the TRP (or network). Second, the UE can measure each of the K CSI-RS resources, calculate an associated CSI (that can include CQI and potentially other CSI parameters such as RI and PMI), and report it to the TRP (or network). Based on the report from the UE, the UE is assigned M≥1 "beams" or RRs either via a higher-layer (RRC) signaling or an L1/L2 control signaling (583). Therefore the UE is connected to these M "beams"/RRs 584.

For certain scenarios such as asynchronous networks, the UE can fall back to cell ID based or cell-level mobility management similar to 3GPP LTE. Therefore, only one of the two levels of radio resource entity (cell) is applicable. Such information, whether the UE should assume beam-level mobility (where cell boundaries are neither observed nor visible from UE perspective) or cell-level mobility (where cell boundaries are observed and visible from UE perspective), can be obtained once a UE is connected to the network. This can be signaled via a DL control signaling, whether on L1, MAC, and/or RRC level.

When a two-level ("cell" and "beam") radio resource entity or management is utilized, synchronization signal(s) can be designed primarily for initial access into the network. For mmWave systems where analog beam sweeping (cf. FIG. 4) or repetition can be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

For the second component (that is, embodiments pertaining to measurement RS), several example embodiments can be described as follows. In the present disclosure, a "beam" or radio resource (RR) ID is carried in a "beam" or RR acquisition signal. Other terms can also be used to represent the same or analogous functionality.

In one embodiment (embodiment I), this "beam"/RR acquisition signal is (or at least includes) a measurement RS that can be configured for a UE using a same resource configuration as CSI-RS. The CSI-RS resource allocation for this measurement RS can be in addition to the resource allocation used for CSI measurements. This separate resource allocation for the measurement RS carrying a "beam"/RR ID can be configured with a certain time and/or frequency resolution, time and/or frequency span, as well as the number of ports. The "beam"/RR ID can be included or signaled in the bit sequence of the measurement RS.

In this embodiment, the measurement RS can be either coverage ("beam"/RR-specific or non-UE-specific) CSI-RS or UE-specific CSI-RS. When this measurement RS is UE-specific, it can be transmitted using different UE-specific CSI-RS resource configurations but carries the same "beam"/RR-specific ID.

Although this measurement RS is intended for "beam"/RR acquisition signal, it can also be used for CSI measurement (both DL-CSI for CSI reporting, and UL-CSI when DL-UL reciprocity holds) when applicable.

In addition, this measurement RS can be configured to support different coverage enhancement schemes such as repetition (especially for narrow band analogous to a small number of PRBs in LTE MTC (Machine-type Communication) or NB-IoT (Narrow-Band Internet-of-Things)) or analog beam sweeping (cf. FIG. 4). For this functionality, a time-domain repetition factor $N_{REP,T}$ can be configured. This time-domain repetition can be performed across time units such as across OFDM symbols, slots, or subframes. For instance, if the chosen time unit is OFDM symbol, the information conveyed by the measurement RS (such as the "beam"/RR ID) is repeated across $N_{REP,T}$ consecutive OFDM symbols.

For mmWave where beam sweeping is used (cf. FIG. 4), repetition across $N_{REP,T}$ consecutive OFDM symbols is used to increase the coverage of the measurement RS. The CSI-RS ports involved in repetition can either be a subset of all the ports, or all the ports. In case of analog beam sweeping (cf. FIG. 4), the set of analog beams swept for a given digital antenna port can either be a subset of all analog beams or all the analog beams. In a first example, only 1 port sweeps a subset or all beams. In a second example, a strict subset of ports sweep simultaneously either a same set of beams (that can be a subset or all beams) or different sets of beams (each of that can be a subset or all beams, and these two subsets can either overlap or not). In a third example, all ports sweep simultaneously using either a same set of beams (that can be a subset or all beams) or different sets of beams (each of that can be a subset or all beams, and these two subsets can either overlap or not).

Alternatively, this repetition can also be done in frequency domain. For this functionality, a frequency-domain repetition factor $N_{REP,F}$ can be configured. This frequency-domain repetition can be performed across frequency units such as across groups of sub-carriers, PRBs, or groups of PRBs.

Figure 6:
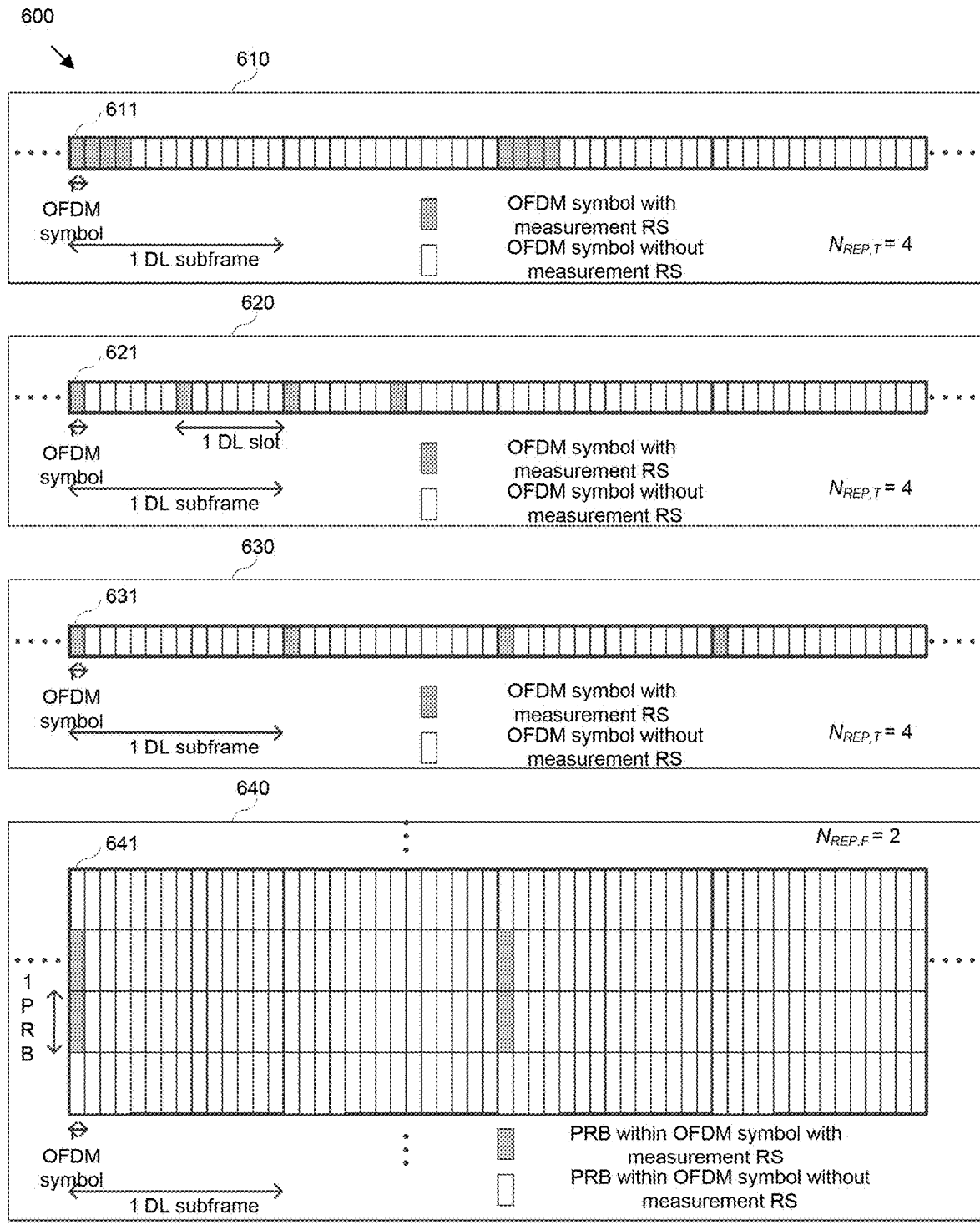
FIG. 6 illustrates several example designs for measurement RS with repetition according to an embodiment of the present disclosure.
Figure 7:
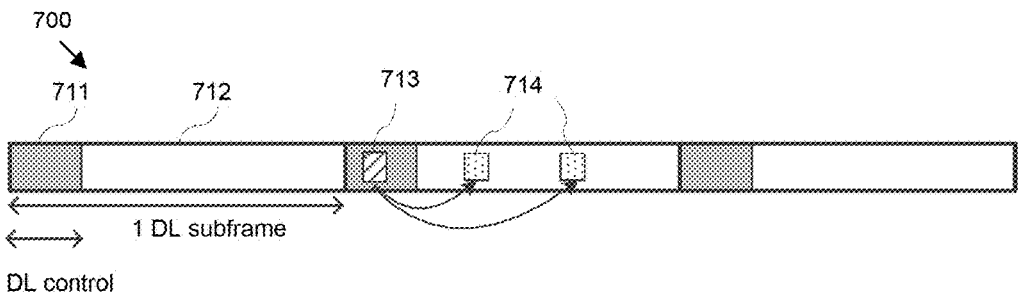
FIG. 7 illustrates an example embodiment of measurement RS transmission and its configuration signaling according to an embodiment of the present disclosure.

Repetition of measurement RS can be illustrated in embodiment 600 of FIG. 6. Three examples 610, 620, and 630 are given for time-domain repetition with $N_{REP,T}=4$, and example 640 for frequency-domain repetition with $N_{REP,F}=2$. For at least one of these four examples in 600, one DL slot includes 7 OFDM symbols and one DL subframe includes two slots. In example 610, time-domain repetition of measurement RS is performed across 4 consecutive OFDM symbols (denoted 611) within a subframe/slot that contains measurement RS. Here, measurement RS is transmitted every other subframe/slot. In example 620, time-domain repetition of measurement RS is performed across 4 consecutive slots where each instance of measurement RS occupies only 1 OFDM symbol (denoted 621). In example 630, time-domain repetition of measurement RS is performed across 4 consecutive subframes where each instance of measurement RS occupies only 1 OFDM symbol (denoted 631). In example 640, frequency-domain repetition of measurement RS is performed across 2 consecutive PRBs (demoted 641) within one OFDM symbol. Such an instance of measurement RS transmission is repeated in every other subframe/slot.

All or at least one of the replicas or repetitions of measurement RS carry the same "beam" or radio resource (RR) ID.

In addition, this measurement RS can be used for time and/or frequency tracking (fine timing/frequency acquisition). For this purpose, CSI-RS resource configuration also includes time-frequency CSI-RS pattern for one subframe/slot-PRB unit.

Therefore, a DL measurement RS can be configured for a UE using a CSI-RS resource configuration with the following features. First, a "beam" or radio resource ID is included in and can be detected from the measurement RS. This ID can be included either as a part of a RS bit sequence, encoded into a RS sequence, or encoded into a time-frequency pattern of the RS. Second, the resource configuration includes the number of ports and time-frequency resolution (for OFDMA, the number of resource elements used across sub-carriers and OFDM symbols). Third, the resource configuration also includes a repetition factor $N_{REP,T}$ in time domain and/or $N_{REP,F}$ in frequency domain that indicate the number of time-domain and/or frequency domain replicas, respectively. Time-domain repetition can be performed across time units such as across OFDM symbols, slots, or subframes. Frequency-domain repetition can be performed across frequency units such as across groups of sub-carriers, PRBs, or groups of PRBs. At least one of these parameters can be configured for a UE via higher-layer (RRC) signaling (for example, the number of ports, time-frequency pattern, and/or repetition factor). The rest of the parameters, if any, can be configured for a UE via L1/L2 control signaling. The configuration or reconfiguration can be done for UEs that are in a CONNECTED state.

For measurement RS, the configured number of (CSI-RS) ports can be the same or different from that used for CSI measurement. In general, however, a small number of antenna ports, such as one or two, can be used especially when beamforming is applied on measurement RS.

In terms of DL transmission and UE measurement, a DL measurement RS can be configured periodically or aperiodically. When a DL measurement RS is periodically transmitted or measured, a higher layer CSI-RS (or CSI-RS like) resource configuration that includes periodicity and reporting offset (such as subframe/slot offset) can be used. This configuration remains until reconfiguration occurs. Alternatively, a measurement RS indicator field can be included in a DL (L1) control signaling to indicate the presence of a DL measurement RS within the subframe/slot or TTI (or time unit used for packet scheduling). This is illustrated in a DL timing diagram embodiment 700 in FIG. 7. For a given subframe/slot (or TTI, or, in general, a time unit for packet scheduling and transmission), a DL control region 711 is transmitted at the beginning of the subframe/slot. A UE receives and attempts to detect either an assignment/grant for DL and/or UL transmissions in the remainder of the DL subframe/slot 712. In addition, the UE can attempt to detect the presence of a measurement RS indicator field. This RS indicator field can be included in a grant/assignment (either DL or UL) or signaled in a separate channel. Likewise, this RS indicator field can be signaled as a UE-specific entity (hence masked or labeled with UE identification such as UE-specific RNTI or C-RNTI), or alternatively, a TRP/cell/RR common entity (hence masked or labeled with a TRP or cell or RR specific RNTI), or alternatively, UE-group-specific entity (such as group RNTI) where a DL control signaling conveys some control information pertaining to a group of UEs. Upon detecting the presence of this RS indicator field, the UE measures a DL measurement RS 714. The measurement RS indicator field 713 can include a trigger to indicate a one-shot measurement RS transmission (that is, the presence of measurement RS only in the same subframe/slot/TTI/scheduling time unit as the DL control that includes indicator field 713). Alternatively, it can include a trigger to indicate a multi-shot measurement RS transmission (that is, the presence of measurement RS in a plurality of subframes/TTIs/scheduling time units, starting either from the subframe/slot containing the indicator field 713 or a subframe/slot after, with a certain periodicity). In this case, a measurement RS indicator field activates or deactivates transmission and UE measurement of the DL measurement RS. Therefore, this scheme is applicable whether a DL measurement RS is transmitted and/or measured periodically or aperiodically.

This measurement RS indicator field 713 can include only the trigger described above. Alternatively, this measurement RS indicator field can include (or be signaled together with) at least one more parameter such as that that indicates the location of the measurement RS, the time-frequency pattern of the RS, or the periodicity in case it is used for multi-shot transmission.

Figure 8:
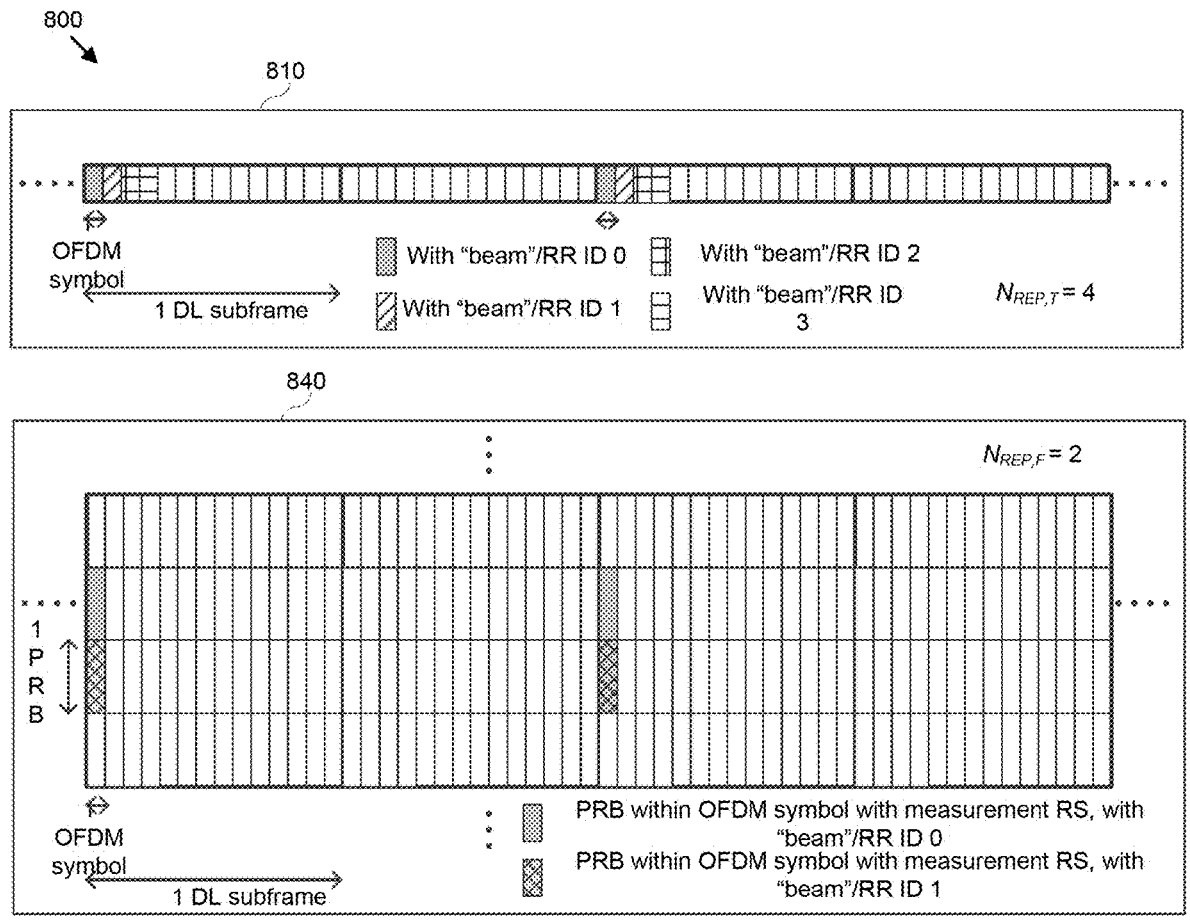
FIG. 8 illustrates an example several example designs for measurement RS with repetition according to an embodiment of the present disclosure.

In a variation of embodiment I, when multiple instances of DL measurement RS are transmitted or measured (that is, $N_{REP,T}>1$ or $N_{REP,F}>1$), different "beam"/RR IDS can be included in different instances of this DL measurement RS. Using two of the four examples in FIG. 6, embodiment 800 of FIG. 8 illustrates this variation of embodiment I. In both embodiments 810 and 840, "beam"/RR IDs are cycled across different instances of DL measurement RS.

For the third component (that is, contents of SS and PBCH), several example embodiments can be described as follows.

In one embodiment (embodiment III.1), following LTE, primary and secondary synchronization signals (PSS and SSS, respectively) can be characterized in TABLE 1. PSS/SSS is used for coarse timing and frequency synchronization and cell ID acquisition. Since PSS/SSS is transmitted twice per 10 ms radio frame and time-domain enumeration is introduced in terms of System Frame Number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. Since PSS/SSS detection can be faulty (due to, for instance, non-idealities in the auto- and cross-correlation properties of PSS/SSS and lack of CRC protection), cell ID hypotheses detected from PSS/SSS can occasionally be confirmed via PBCH detection. PBCH is primarily used to signal the Master Block Information (MIB) that includes DL and UL system bandwidth information (3 bits), PHICH information (3 bits), and SFN (3 bits). Adding 10 reserved bits (for other uses such as MTC), the MIB payload amounts to 24 bits. After appended with a 16-bit CRC, a rate-⅓ tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of cell-specific RS (CRS) ports is also needed for PBCH.

TABLE 1

Example of contents of PSS/SSS and PBCH following LTE

| | LTE PSS/SSS | LTE PBCH |
|---|---|---|
| Function | Coarse time-frequency synchronization & cell ID acquisition | MIB acquisition, [confirming cell ID acquisition] |
| Parameters included | Cell ID (504 hypotheses), frame timing (2 hypotheses) | MIB: system BW (3 bits), PHICH info (3 bits), SFN (8 bits) + [10 reserved bits] |
| Need for blind detection | CP size (from SSS), [TDD vs. FDD] | Number of CRS ports |
| Reliability | Low to moderate | High (protected with 16-bit CRC + 1/48 effective code rate) |

In some other embodiments below, especially for 5G NR, it is desirable to minimize the number of hypotheses associated with synchronization signals (termed the nrSS in the present disclosure, that can include nrPSS and nrSSS) and PBCH (termed the nrPBCH in the present disclosure, that includes MIB). In the following embodiments, MIB payload can be minimized by not including PHICH information (that is not needed when the number of symbols used for DL control channel, such as PDCCH, does not change from subframe/slot to subframe/slot). In this case, MIB includes DL and UL system bandwidth information and SFN, but not PHICH information.

At least the following design issues can be identified. First, what is the transmission bandwidth for nrSS and nrPBCH? Second, is DL numerology (as discussed in FIG. 5, that can include CP length, sub-carrier spacing, and/or subframe/slot duration) a UE-specific or cell-specific feature (or alternatively RRU-specific or "beam"-specific)? Third, if nrSS is transmitted N times within one nrSS period (such as when beam sweeping is used, cf. FIG. 6), symbol or subframe/slot timing needs to be detected. In this case, what is a good mechanism to convey such timing information?

The first issue is related to the minimum DL system bandwidth supported by NR. Note that 20 MHz DL reception is used for UE category 1 or above (a UE category is characterized by peak data rate and soft buffer size). The 1.4 MHz (6-PRB) minimum BW is decided from network perspective (e.g. re-farming of GSM/GPRS carriers). For LTE, PSS/SSS and PBCH are transmitted with a minimum and known bandwidth at a known location in frequency domain (center 6 PRBs). Since the location is fixed, there is no need for a UE to detect the location and transmission bandwidth for PSS/SSS and PBCH. System bandwidth information (that is cell-specific) is included in the MIB (hence transmitted via PBCH).

For 5G NR, if nrSS and/or nrPBCH are system-bandwidth-dependent (transmitted with the same system bandwidth as other signals and channels—system bandwidth and nrSS/nrPBCH transmission bandwidth are different), system bandwidth information needs to be detected (either blindly or explicitly) from nrSS. However, this option is less preferred due to reliability issue of nrSS. The number of possible system bandwidth values (at least 8—from LTE, and possibly more for NR) and location hypotheses can be too large to be included in nrSS.

Based on the above consideration, the following option embodiments are described as follows.

In one embodiment (embodiment III.2), nrSS (that can include nrPSS and nrSSS) and/or nrPBCH are transmitted with a known bandwidth (such as the minimum system bandwidth). For this embodiment, system bandwidth information that is used for other signals and channels (such as PDSCH or PUSCH) is included in the MIB. This system bandwidth information can represent all the possible system bandwidth values.

In another embodiment (embodiment III.3), at least one of nrSS (that can include nrPSS and nrSSS) and nrPBCH with one out of a small number ($BW_{SS}$ and/or $BW_{PBCH}$) of possible nrSS/PBCH transmission bandwidth values (for instance, $BW_{SS}=2$ or $BW_{PBCH}=2$). For this embodiment, system bandwidth information that is used for other signals and channels (such as PDSCH or PUSCH) is included in the MIB. This (full) system bandwidth information can represent all the possible system bandwidth values. Alternatively, if the system bandwidth is correlated with nrSS/nrPBCH transmission bandwidth, partial system bandwidth information can be included in the MIB. Examples of such a correspondence are given in the tables below.

Here, bandwidth can be described either in terms of a number of frequency-domain resource blocks (such as that analogous to RB or PRB in LTE) or in Hertz (Hz). The description in terms of the number of frequency-domain resource blocks is preferred.

In TABLE 2A, nrSS and nrPBCH are transmitted with (occupy) the same bandwidth. Depending on the system bandwidth, nrSS and/or nrPBCH occupy one of the two bandwidth values ($BW_1$ or $BW_2$ where $BW_1<BW_2$). As example, $BW_1=1.4$ MHz (or a number of PRBs associated with it, such as 6 PRBs) and $BW_2=10$ MHz (or a number of PRBs associated with it, such as 50 PRBs). In this case, the transmission bandwidth for nrSS/nrPBCH can either be signaled via nrSS (such as nrSSS, hence doubling the number of hypotheses in nrSS) or blindly detected from nrSS and/or nrPBCH.

TABLE 2A

Example correspondence between system bandwidth and nrSS/nrPBCH transmission bandwidth

| System bandwidth | nrSS bandwidth | nrPBCH bandwidth |
|---|---|---|
| System BW ≤ $BW_2$ | $BW_1$ | $BW_1$ |
| System BW > $BW_2$ | $BW_2$ | $BW_2$ |

In TABLE 2B, on the other hand, nrSS is transmitted with (occupies) one bandwidth value $BW_1$, while nrPBCH can be transmitted (occupy) one of the two bandwidth values ($BW_1$ and $BW_2$). Depending on the system bandwidth, nrPBCH occupies one of the two bandwidth values ($BW_1$ or $BW_2$ where $BW_1<BW_2$). In this case, the transmission bandwidth for nrPBCH can either be signaled via nrSS (such as nrSSS, hence doubling the number of hypotheses in nrSS), nrPBCH (hence doubling the number of hypotheses in the MIB), or blindly detected from nrPBCH.

TABLE 2B

Example correspondence between system bandwidth and nrSS/nrPBCH transmission bandwidth

| System bandwidth | nrSS bandwidth | nrPBCH bandwidth |
|---|---|---|
| System BW ≤ $BW_2$ | $BW_1$ | $BW_1$ |
| System BW > $BW_2$ |  | $BW_2$ |

In TABLE 2C, nrSS includes nrPSS and nrSSS where nrPSS is transmitted with (occupies) one bandwidth value $BW_1$, while nrSSS and nrPBCH can be transmitted (occupy) one of the two bandwidth values ($BW_1$ and $BW_2$). Depending on the system bandwidth, nrSSS and nrPBCH occupy one of the two bandwidth values ($BW_1$ or $BW_2$ where $BW_1<BW_2$). In this case, the transmission bandwidth for nrSSS and nrPBCH can either be signaled via nrSS (such as nrSSS, hence doubling the number of hypotheses in nrSS), nrPBCH (hence doubling the number of hypotheses in the MIB), or blindly detected from nrSSS and/or nrPBCH.

TABLE 2C

Example correspondence between system bandwidth and nrSS/nrPBCH transmission bandwidth

| System bandwidth | nrPSS bandwidth | nrSSS bandwidth | nrPBCH bandwidth |
|---|---|---|---|
| System BW ≤ $BW_2$ | $BW_1$ | $BW_1$ | $BW_1$ |
| System BW > $BW_2$ |  | $BW_2$ | $BW_2$ |

In either of the above option embodiments (described in the tables), one fixed and known location of nrSS/nrPBCH is used, at least for a given scenario (such as for a carrier frequency). However, this does not preclude having different frequency-domain locations for different scenarios.

The above examples can be extended for P>2 bandwidth values $\{BW_1, BW_2, BW_p\}$. For instance, with P=4, TABLE 2C can be extended in either TABLE 2D (where nrSSS and nrPBCH can be transmitted (occupy) one bandwidth value) or TABLE 2E (where nrSSS and nrPBCH can be transmitted (occupy) one of two bandwidth values).

TABLE 2D

Example correspondence between system bandwidth and nrSS/nrPBCH transmission bandwidth

| System bandwidth | nrPSS bandwidth | nrSSS bandwidth | nrPBCH bandwidth |
|---|---|---|---|
| System BW ≤ $BW_2$ | $BW_1$ | $BW_1$ | $BW_1$ |
| $BW_2$ < System BW ≤ $BW_3$ | | $BW_2$ | $BW_2$ |
| $BW_3$ < System BW ≤ $BW_4$ | | $BW_3$ | $BW_3$ |
| System BW > $BW_4$ | | $BW_4$ | $BW_4$ |

TABLE 2E

Example correspondence between system bandwidth and nrSS/nrPBCH transmission bandwidth

| System bandwidth | nrPSS bandwidth | nrSSS bandwidth | nrPBCH bandwidth |
|---|---|---|---|
| System BW ≤ $BW_2$ | $BW_1$ | $BW_1$ | $BW_1$ |
| $BW_2$ < System BW ≤ $BW_3$ | | $BW_2$ | $BW_2$ |
| $BW_3$ < System BW ≤ $BW_4$ | $BW_3$ | $BW_3$ | $BW_3$ |
| System BW > $BW_4$ | | $BW_4$ | $BW_4$ |

In either of the above option embodiments (described in the tables), one fixed and known location of nrSS/nrPBCH is used, at least for a given scenario (such as for a carrier frequency). However, this does not preclude having different frequency-domain locations for different scenarios.

In another embodiment (embodiment III.4), at least one of nrPSS and nrSSS, and/or nrPBCH, occupy a set of frequency-domain resources (transmission bandwidth) that scales with sub-carrier spacing (nrSS can be transmitted with variable numerology). This is relevant when at least one of nrPSS and nrSSS is transmitted with variable sub-carrier spacing. When nrPSS is transmitted in this manner, one common sequence is used for nrPSS irrespective of the sub-carrier spacing. Likewise, when nrSSS is transmitted in this manner, one common sequence is used for nrSSS irrespective of the sub-carrier spacing.

For the second issue, numerology (that includes any combination of CP length, sub-carrier spacing, and/or sub-frame/slot length) for data and/or dedicated control can either be UE-specific or cell-(or "RRU"-) specific. This can be related to whether nrSS and/or nrPBCH are transmitted with fixed/common numerology. For data and/or dedicated control transmission, if numerology is UE-specific (that is, multiplexing UEs with different numerologies within one TTI is allowed), numerology information is configured via higher-layer signaling (that is, RRC-configured). This allows a TRP to multiplex multiple data transmissions via TDM (time-division multiplexing), FDM (frequency-division multiplexing), or SDM (space-division multiplexing, such as multi-user MIMO). On the other hand, if the numerology is cell/RRU-specific (hence common for all UEs within a cell/RRU), numerology information can be signaled either in MIB or SIB-x as a part of broadcast information. For nrSS (that can include nrPSS and nrSSS) and nrPBCH transmission (as well as other common channels), the following option embodiments are possible.

In one embodiment (embodiment III.5), a fixed and common numerology is used for nrSS (that can include nrPSS and nrSSS) and nrPBCH transmission. For example, a fixed and common sub-carrier spacing is used. For this embodiment, cell-specific numerology information (such as sub-carrier spacing) can be included in the MIB to allow variable numerology for system information (SI-x) transmission. Here, a designated DL assignment can be used for indicating a transmission of system information in a given TTI where the DL assignment also carries an indicator analogous to LTE's SI-RNTI. In this case, system information can be received by a UE after the UE decodes the MIB from nrPBCH.

In another embodiment (embodiment III.6), variable numerology can be used for nrSS (that can include nrPSS and nrSSS) and nrPBCH transmission where all the possible values of sub-carrier spacing used for data channel transmission are applicable. For example, variable sub-carrier spacing (one value selected from {15, 30, 60, 120} kHz) can be used for nrSS (that can include nrPSS and nrSSS) and nrPBCH transmission. Here, the transmission bandwidth depends on whether a common synchronization sequence is used for nrPSS and/or nrSSS transmitted with different values of sub-carrier spacing. If a common sequence is used, transmission bandwidth linearly scales with the value of sub-carrier spacing. On the other hand, if the transmission bandwidth is kept the same for different values of sub-carrier spacing, different sequence lengths (hence different sequences) are used for different values of sub-carrier spacing. Since sub-carrier spacing (as well as transmission bandwidth) is to be assumed at the UE for receiving and demodulating nrPSS/nrSSS, sub-carrier spacing (as well as transmission bandwidth) can be detected blindly at the UE. That is, the UE can repeat reception and demodulation of nrPSS/nrSSS by assuming different values of sub-carrier spacing (as well as transmission bandwidth).

In another embodiment (embodiment III.7), variable numerology can be used for nrSS (that can include nrPSS and nrSSS) and nrPBCH transmission where only a subset of all the possible values of sub-carrier spacing used for data channel transmission are applicable. For example, if {15, 30, 60, 120} kHz can be used for data channel transmission, variable sub-carrier spacing (one value selected from {15, 60} kHz) can be used for nrSS (that can include nrPSS and nrSSS) and nrPBCH transmission. Here, the transmission bandwidth depends on whether a common synchronization sequence is used for nrPSS and/or nrSSS transmitted with different values of sub-carrier spacing. If a common sequence is used, transmission bandwidth linearly scales with the value of sub-carrier spacing. On the other hand, if the transmission bandwidth is kept the same for different values of sub-carrier spacing, different sequence lengths (hence different sequences) are used for different values of sub-carrier spacing. Since sub-carrier spacing (as well as transmission bandwidth) is to be assumed at the UE for receiving and demodulating nrPSS/nrSSS, sub-carrier spacing (as well as transmission bandwidth) can be detected blindly at the UE. That is, the UE can repeat reception and demodulation of nrPSS/nrSSS by assuming different values of sub-carrier spacing (as well as transmission bandwidth).

For this embodiment, cell-specific numerology information (such as sub-carrier spacing) can be included in the MIB to allow variable numerology for system information (SI-x) transmission. Here, a designated DL assignment can be used for indicating a transmission of system information in a given TTI where the DL assignment also carries an indicator analogous to LTE's SI-RNTI. In this case, system information can be received by a UE after the UE decodes the MIB from nrPBCH. Two options are possible. First, full cell-specific numerology information (such as sub-carrier spacing) is included in the MIB. This is relevant when there is no correlation between the numerology used for nrSS and nrPBCH and the numerology used for system information transmission. Second, partial cell-specific numerology information (such as sub-carrier spacing) is included in the MIB. This is relevant when there is some correlation between the numerology used for nrSS and nrPBCH and the numerology used for system information transmission. For example, when 15 kHz sub-carrier spacing is for nrSS/nrPBCH, possible sub-carrier spacing values for system information transmission can be either 15 kHz or 30 kHz. When 60 kHz sub-carrier spacing is for nrSS/nrPBCH, possible sub-carrier spacing values for system information transmission can be either 60 kHz or 120 kHz.

UE-specific numerology for data and/or dedicated control transmission can be used in conjunction with cell-specific numerology for common channel/signal (such as nrPSS, nrSSS, and/or nrPBCH) transmission. The cell-specific numerology for common channel/signal is either known or detected from at least one of the common channel/signals. Once a UE acquires the MIB, system information, and establishes an RRC connection, a UE receives a higher-layer configuration for the UE-specific numerology for data and/or dedicated control transmission. This is illustrated in example method 900 of FIG. 9. In step 910, a UE detects cell-specific numerology from nrPSS and/or nrSSS. In this example, this cell-specific numerology corresponds to sub-carrier spacing. Since the same sub-carrier spacing is used for nrPBCH, the acquired knowledge of cell-specific sub-carrier spacing can be used to decode the MIB from nrPBCH in step 920. Continuing with steps 930 (reading System Information) and 940 (UL synchronization and random access), the UE has established an RRC connection with a TRP or a cell (hence in RRC_CONNECTED state) (step 950). The UE can receive RRC configurations including UE-specific numerology configuration that is used for data and dedicated control transmission.

For the third issue, multiple (N>1) transmissions of nrSS (that can include nrPSS and nrSSS) and/or nrPBCH within one transmission period (for instance, 10 ms radio frame) across N OFDM symbols implies that timing information, such as symbol timing, needs to be detected by a UE. In this case, symbol timing refers to the symbol number (or index) within one transmission period or one subframe/slot. Two scenarios with multiple transmissions are as follows.

In scenario 1, nrSS/nrPBCH is repeated N times across N OFDM symbols. The purpose of such repetition is to enhance nrSS/nrPBCH coverage within one transmission period. To benefit from the coverage gain of N-time repetition, N should be taken into account by a UE. The value of N can either be fixed in the specification (hence signaling or blind decoding is not needed) or varied (hence blind detection is needed). If timing needs to be detected, it is automatically detected upon nrSS acquisition.

Therefore, in one embodiment (embodiment III.8), nrSS (that can include nrPSS and nrSSS) and/or nrPBCH are transmitted with multiple N>1 copies across N OFDM symbols within one transmission period. The value of N can either be fixed in the specification (hence signaling or blind decoding is not needed) or varied (hence blind detection is needed).

In scenario 2, beam cycling or beam sweeping across N beams across N OFDM symbols is applied on nrSS/nrPBCH. This scenario is especially relevant when mmWave analog/hybrid beamforming architecture (also termed the "multi-beam" architecture) is used. Therefore, for each of nrPSS, nrSSS, and nrPBCH, different beams are used across N different symbols. Unlike in scenario 2, the coverage gain from beamforming can be obtained from detecting and demodulating only one of N symbols. Therefore, the value of N does not need to be taken into account by the UE. That is, N can be made transparent to the UE during nrSS acquisition. However, timing hypothesis needs to be detected either during nrSS (either explicit hypotheses or blind detection) or nrPBCH (either explicit hypotheses or blind detection) acquisition. The following option embodiments are applicable.

Therefore, in another embodiment (embodiment III.9), nrSS (that can include nrPSS and nrSSS) and/or nrPBCH are transmitted N times across N OFDM symbols within one transmission period. In this case, the value of N is neither specified nor detected by the UE. Timing information is included in nrSS (either in nrPSS or nrSSS). This timing information can be a symbol timing parameter that corresponds to a symbol index within one subframe/slot or TTI. For example, if one subframe/slot or TTI includes $N_{SYM}$ OFDM symbols, the value of the symbol index ranges from 0 to $(N_{SYM}-1)$. Alternatively, the symbol timing parameter can correspond to a symbol index within one radio frame or one transmission period for nrSS/nrPBCH. This timing information is to be detected by the UE upon receiving nrSS (either nrPSS or nrSSS).

In another embodiment (embodiment III.10), nrSS (that can include nrPSS and nrSSS) and/or nrPBCH are transmitted N times across N OFDM symbols within one transmission period. In this case, the value of N is neither specified nor detected by the UE. Timing is included in the MIB (and hence in nrPBCH). This timing information can be a symbol timing parameter that corresponds to a symbol index within one subframe/slot or TTI. For example, if one subframe/slot or TTI includes $N_{SYM}$ OFDM symbols, the value of the symbol index ranges from 0 to $(N_{SYM}-1)$. Alternatively, the symbol timing parameter can correspond to a symbol index within one radio frame or one transmission period for nrSS/nrPBCH. This timing information is to be detected by the UE. This timing information is to be detected by the UE upon decoding the MIB from nrPBCH.

In another embodiment (embodiment III.11), nrSS (that can include nrPSS and nrSSS) and/or nrPBCH are transmitted N times across N OFDM symbols within one transmission period. In this case, the value of N is neither specified nor detected by the UE. Timing information (such as symbol timing, either within a subframe/slot or a radio frame or a transmission period) is not included in nrSS or nrPBCH. Therefore, this timing information is to be detected blindly from either nrSS or nrPBCH or both.

Based on the above considerations, some examples are described in TABLE 3 below.

TABLE 3

Parameters included in nrSS and nrPBCH - examples

| Example | | Synchronization signals: nrSS (nrPSS/nrSSS) | Primary BCH: nrPBCH |
|---|---|---|---|
| A1 | Parameters included | Cell ID ($N_{CID}$ hypotheses), symbol timing ($N_{SYM}$ hypotheses) | MIB: system bandwidth information ($n_1$ bits), SFN (8 bits), numerology info ($n_2$ bits) + [m reserved bits] |
| | Need for blind detection | n/a | n/a |
| A2 | Parameters included | Cell ID ($N_{CID}$ hypotheses) | MIB: system bandwidth information ($n_1$ bits), SFN (8 bits), numerology info ($n_2$ bits), symbol timing ($n_3$ bits) + [m reserved bits] |
| | Need for blind detection | n/a | n/a |
| A3 | Parameters included | Cell ID ($N_{CID}$ hypotheses) | MIB: system bandwidth information ($n_1$ bits), SFN (8 bits), numerology info ($n_2$ bits) + [m reserved bits] |
| | Need for blind detection | n/a | Symbol timing |
| B1 | Parameters included | Cell ID ($N_{CID}$ hypotheses), symbol timing ($N_{SYM}$ hypotheses) | MIB: system bandwidth information ($n_1$ bits), SFN (8 bits), +[m reserved bits] |
| | Need for blind detection | n/a | n/a |
| B2 | Parameters included | Cell ID ($N_{CID}$ hypotheses) | MIB: system bandwidth information ($n_1$ bits), SFN (8 bits), symbol timing ($n_3$ bits) + [m reserved bits] |
| | Need for blind detection | n/a | n/a |
| B3 | Parameters included | Cell ID ($N_{CID}$ hypotheses) | MIB: system bandwidth information ($n_1$ bits), SFN (8 bits), +[m reserved bits] |
| | Need for blind detection | n/a | Symbol timing |

In the above examples, it is assumed that when transmit diversity is used for nrSS or nrPBCH, a UE-transparent transmit diversity scheme is used. Therefore, only one antenna port is used for nrSS/nrPBCH transmission.

System bandwidth information included in the MIB can include both DL and UL system bandwidth information. Alternatively, only DL system bandwidth information is included in the MIB while UL system bandwidth information is included as a part of system information.

Numerology information in the MIB can include one or a plurality of parameters such as sub-carrier spacing, CP length, and/or OFDM symbol duration (or subframe/slot length).

A variation of the above examples can be devised by including a need for blind detection of transmission bandwidth associated with at least one of nrPSS, nrSSS, and nrPBCH. This transmission bandwidth is not the same as the system bandwidth. However, the transmission bandwidth of nrPSS, nrSSS, and/or nrPBCH can be correlated with the system bandwidth as described in TABLE 2A, 2B, 2C, 2D, and 2E. In this case, the payload associated with system bandwidth information included in the MIB can be reduced since the system bandwidth can be inferred from both transmission bandwidth of nrPSS/nrSSS/nrPBCH and the system bandwidth information in the MIB.

Figure 9:
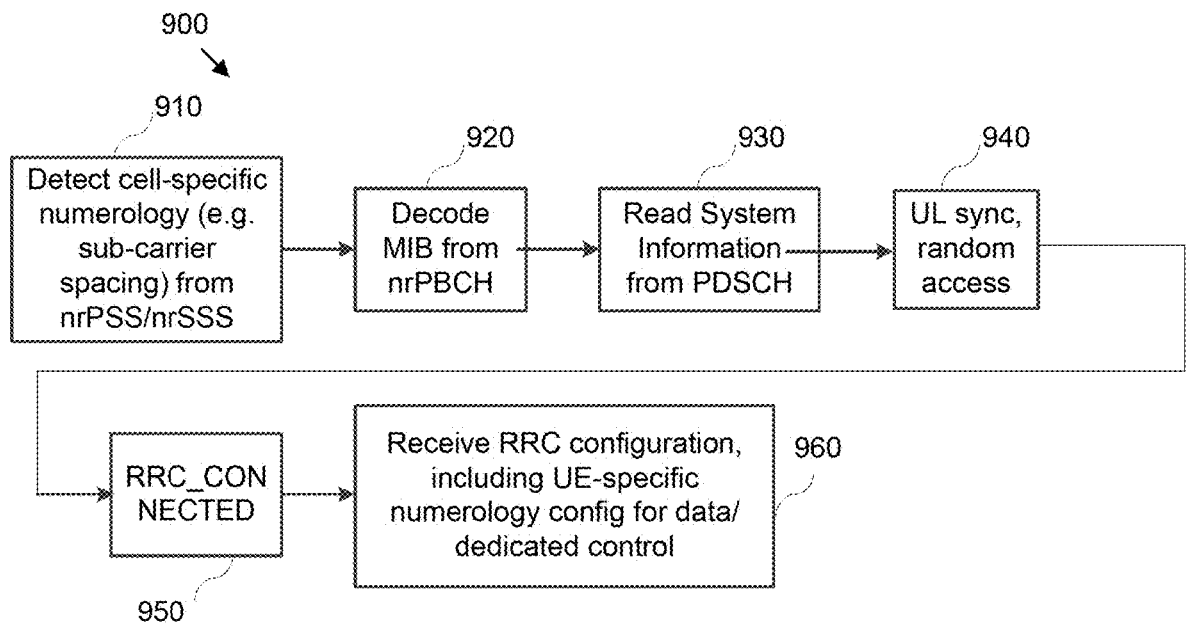
FIG. 9 illustrates an example initial access procedure that includes receiving PSS, SSS, PBCH, and system information according to an embodiment of the present disclosure.

Another variation of the above examples can be devised by including a need for blind detection of cell-specific numerology information from at least one of nrPSS and nrSSS (see method 900 of FIG. 9). This is relevant, for example, when nrPSS/nrSSS/nrPBCH can be transmitted with variable sub-carrier spacing. In this case, a UE performs blind detection of sub-carrier spacing from nrPSS and/or nrSSS.

While cell-specific numerology information such as cell-specific sub-carrier spacing can be detected from nrPSS and/or nrSSS in the variation described in the preceding paragraph, another variation is to include this cell-specific numerology information in the MIB (such as in examples A1, A2, and A3). Therefore, this cell-specific numerology is not used for nrPSS and/or nrSSS. But it can be used for at least one of nrPBCH as well as transmission resource in the data channel containing System Information.

In examples B1, B2, and B3, cell-specific numerology information is neither included in nor blindly detected from nrPSS/nrSSS/nrPBCH. In this case, common signals/channels (including nrPSS, nrSSS, nrPBCH, and/or transmission resource carrying System Information) are transmitted with a fixed and common numerology (such as sub-carrier spacing).

In examples A3 and B3, symbol timing is blindly detected from nrPBCH. Alternatively, symbol timing can be blindly detected from nrPSS and/or nrSSS. Yet another variation of examples A3 and B3 is not to detect symbol timing at all. This variation is especially relevant for single-beam scenario where a UE can assume that nrPSS and/or nrSSS are transmitted only once (N=1). Since there is only one location for nrPSS and/or nrSSS in time-domain, symbol timing is automatically known upon a successful detection of nrPSS and/or nrSSS.

For the fourth component (that is, embodiments for SS), several example embodiments can be described as follows. In the present disclosure, synchronization signal includes primary and secondary synchronization signals (PSS and SSS, or nrPSS and nrSSS). In design embodiments given below, nrSS includes nrPSS (primarily intended for coarse time-frequency synchronization) and nrSSS (primarily intended for cell ID detection), each of that can be transmitted either periodically or aperiodically. For periodic transmission, nrPSS and nrSSS are transmitted either once or N>1 times per radio frame. As previously explained, transmitting nrPSS or nrSSS multiple times is intended to enhance coverage via, for instance, beam sweeping. For aperiodic transmission (especially relevant when nrPSS and nrSSS are transmitted once), nrPSS and/or nrSSS can be transmitted in any subframe/slot or a subframe/slot within a set of allowable nrSS subframes.

In one embodiment (embodiment IV.1), nrPSS corresponds to a common primary synchronization sequence for a given value of cell ID. Therefore, the primary synchronization sequence does not carry any partial cell ID information. If variable numerology (such as variable sub-carrier spacing) can be used for nrPSS, either a common primary synchronization sequence is used for all possible values of sub-carrier spacing (thereby resulting in variable transmission bandwidth) or one distinct primary synchronization sequences can be used for one value of sub-carrier spacing. That is, primary synchronization sequence is sub-carrier-spacing-specific.

In another embodiment (embodiment IV.2), nrPSS can carry one out of K>1 primary synchronization sequences (analogous to LTE) wherein each sequence is associated with a subset of cell ID values. Therefore, primary synchronization sequence carries partial cell ID information. If variable numerology (such as variable sub-carrier spacing) can be used for nrPSS, either a common set of K primary synchronization sequences is used for all possible values of sub-carrier spacing (thereby resulting in variable transmission bandwidth) or one distinct set of K primary synchronization sequences can be used for one value of sub-carrier spacing. That is, the set of K primary synchronization sequences is sub-carrier-spacing-specific.

In the following, several embodiments of a multi-format nrPSS/nrSSS design where $Q_{PSS} \geq 1$ distinct formats of nrPSS and $Q_{SSS} > 1$ distinct formats of nrSSS associated with one nrPSS format is described. Therefore, there can be up to $Q_{PSS} \times Q_{SSS}$ distinct nrSSS formats.

In terms of the number of transmissions ($N \geq 1$) of nrPSS/nrSSS/nrPBCH, the same value of N can be used for nrPSS, nrSSS, and nrPBCH. This is because at least two of these three common signals/channels share more or less the same coverage requirement—especially during initial access procedure. Here, format can include any one or combination of sub-carrier spacing, time-frequency location, sequence design (type and/or length), transmission bandwidth, and/or CP length for one transmission instance of nrPSS and/or nrSSS. Therefore, two different formats are differentiated by at least one numerology parameter. This facilitates a UE to perform blind detection of the nrSSS format. That is, cell ID decoding attempt is repeated across all the possible format hypotheses.

In one embodiment (IV.3), $Q_{PSS}=1$ (a single format nrPSS) is used while $Q_{SSS}>1$ (multi-format nrSSS) is used for different use cases. Examples of two-format nrSSS design (with a single format nrPSS) are given in TABLE 4. An example of a single-format nrPSS is to transmit nrPSS with a fixed and common sub-carrier spacing.

TABLE 4

Examples of two-format ($Q_{PSS}$ = 2) nrSSS

| Ex. | nrSSS format | Multiplexing with nrPSS | Frequency domain location | Bandwidth | Example use cases |
|---|---|---|---|---|---|
| 1 | 1 | TDM | Same location as nrPSS | Same as nrPSS | Sub-6 GHz, nrSS transmitted with N = 1 |
|   | 2 | FDM | Fixed location | Same as nrPSS | >6 GHz, nrSS transmitted with N > 1 |
| 2 | 1 | TDM | Same location as nrPSS | Same as nrPSS | Sub-6 GHz, nrSS transmitted with N = 1 |
|   | 2 | FDM | Fixed location | Wider than nrPSS | >6 GHz, nrSS transmitted with N > 1 |
| 3 | 1 | TDM | Same location as nrPSS | Wider than nrPSS | Sub-6 GHz, nrSS transmitted with N = 1 |
|   | 2 | FDM | Fixed location | Wider than nrPSS (can be the same or different from format 1) | >6 GHz, nrSS transmitted with N > 1 |
| 4 | 1 | TDM | Same location as nrPSS | Same as nrPSS | Sub-6 GHz, nrSS transmitted with N = 1 |
|   | 2 | TDM | Same location as nrPSS | Same as nrPSS | >6 GHz, nrSS transmitted with N > 1 |
| 5 | 1 | TDM | Same location as nrPSS | Same as nrPSS | Sub-6 GHz, nrSS transmitted with N = 1 |
|   | 2 | TDM | Same location as nrPSS | Wider than nrPSS | >6 GHz, nrSS transmitted with N ≥ 1 |
| 6 | 1 | TDM | Same location as nrPSS | Wider than nrPSS | Sub-6 GHz, nrSS transmitted with N = 1 |
|   | 2 | TDM | Same location as nrPSS | Wider than nrPSS (can be the same or different from format 1) | >6 GHz, nrSS transmitted with N ≥ 1 |

For the examples in TABLE 4, at least one of the following features can be used. First, the one common nrPSS format used for both nrSSS formats is utilized primarily for coarse time-frequency synchronization. In this case, a narrow transmission bandwidth for nrPSS can be used. Second, by detecting the format of nrSSS (format 1 versus format 2), the UE can acquire information on use case(s), such as single-versus multi-beam access, partial numerology information (sub-carrier spacing and/or transmission bandwidth of nrSSS).

Figure 10:
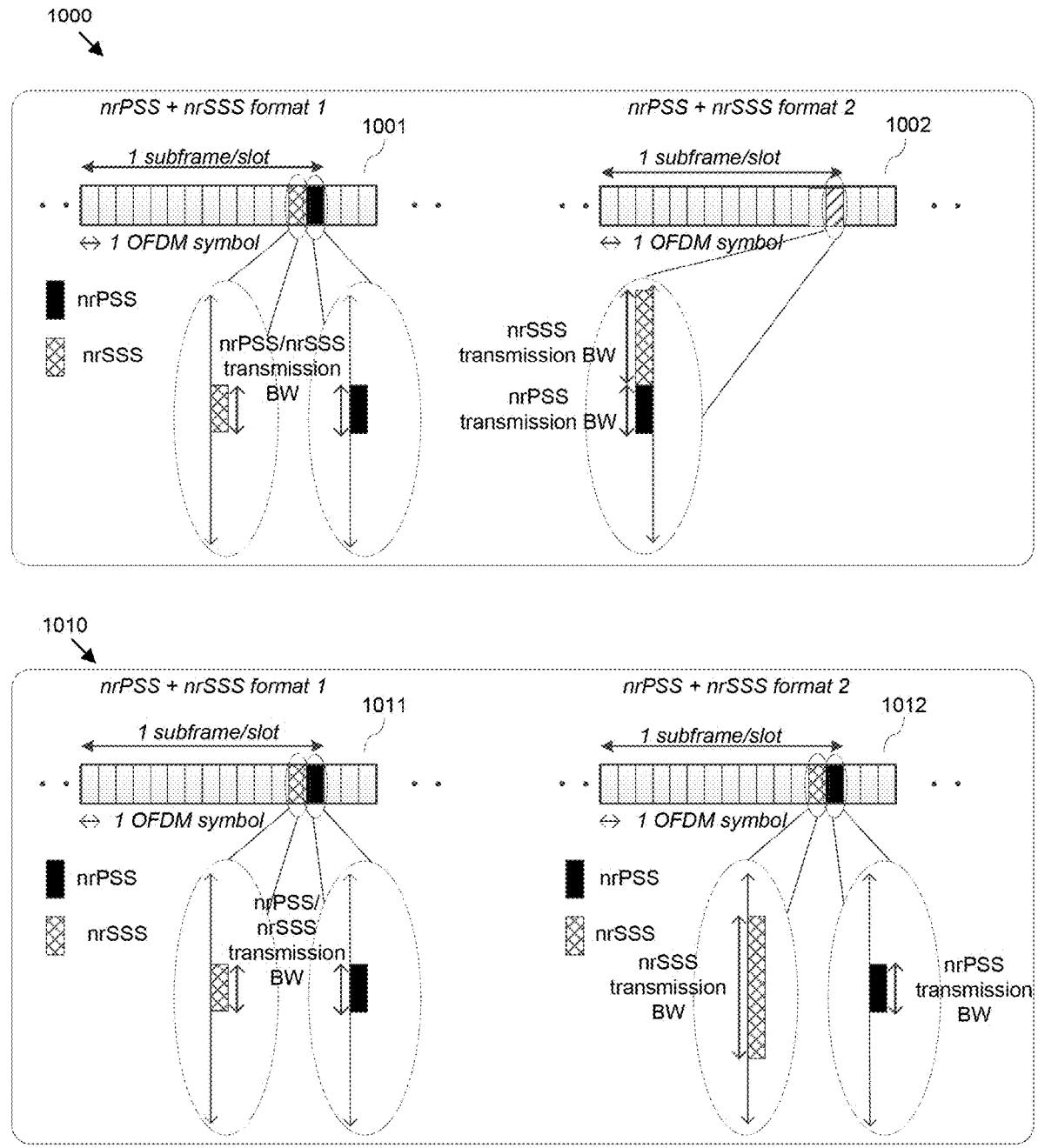
FIG. 10 illustrates several example multiplexing schemes for PSS, SSS, and PBCH in time and frequency domain according to an embodiment of the present disclosure.

Examples 2 and 5 are illustrated in embodiments 1000 and 1010 of FIG. 10, respectively. The number of OFDM symbols per subframe/slot (7) used in these examples is chosen for illustrative purposes. Extension to other examples can be straightforwardly inferred by those familiar with the art.

In embodiment 1000, nrPSS and format 1 nrSSS are multiplexed in time-domain across two OFDM symbols (1001) while nrPSS and format 2 nrSSS are multiplexed in frequency-domain within one OFDM symbol (1002). The transmission bandwidth for nrPSS remains the same (single-valued) while the transmission bandwidth for format 2 nrSSS is larger than that of format 1 nrSSS and nrPSS. When used with N>1 and beam sweeping architecture, the symbol that contains nrPSS and format 2 nrSSS (in 1002) is transmitted N times.

In embodiment 1010, nrPSS and format 1 nrSSS are multiplexed in time-domain across two OFDM symbols (1011) while nrPSS and format 2 nrSSS are also multiplexed in time-domain across two OFDM symbols (1012). The transmission bandwidth for nrPSS remains the same (single-valued) while the transmission bandwidth for format 2 nrSSS is larger than that of format 1 nrSSS and nrPSS. When used with N>1 and beam sweeping architecture, the two symbols that contains nrPSS and format 2 nrSSS (in 1012) are transmitted N times.

In another embodiment (IV.4), $Q_{PSS}>1$ (a multi-format nrPSS) is used. Each of the $Q_{PSS}$ nrPSS formats can be associated with a certain use case. For each of the nrPSS formats, $Q_{SSS}>1$ nrSSS formats are used in the same manner as the previous embodiment I.

In a sub-embodiment of embodiment II (sub-embodiment II.1), each of the $Q_{PSS}$ nrPSS formats is associated with a distinct sub-carrier spacing value (hence a total of $Q_{PSS}$ sub-carrier spacing values). For illustrative purposes, this nrPSS with variable sub-carrier spacing can be combined with any of the examples in TABLE 4 where $Q_{SSS}=2$.

Yet another sub-embodiment can be designed by combining sub-embodiment II.1 with a previous embodiment where the transmission bandwidths of nrPSS and nrSSS scale with sub-carrier spacing. For this sub-embodiment, a same (common) primary synchronization sequence can be used for different values of sub-carrier spacing. For secondary synchronization sequences, sequence length remains the same for different values of sub-carrier spacing.

For instance, in case of example 2 or 5 from TABLE 4, nrPSS and nrSSS format 1 occupy a same transmission bandwidth of $BW_{PSS}=A\times\delta_{SCS}$ while nrSSS format 2 occupies a transmission bandwidth of $BW_{SSS2}=B\times\delta_{SCS}$. Here $\delta_{SCS}$ denotes the sub-carrier spacing that is variable (such as {15, 30, 60, 120} kHz or {15, 60} kHz). The constants A and B can be chosen such that $A\times\max\{\delta_{SCS}\}<B\times\min\{\delta_{SCS}\}$ or, alternatively, the sets $\{A\times\delta_{SCS}\}$ and $\{B\times\delta_{SCS}\}$ do not intersect with each other.

In case of example 3 or 6 from TABLE 4 where the transmission bandwidth of format 1 nrSSS is the same as that of format 2 nrSSS, nrPSS occupies a transmission bandwidth of $BW_{PSS}=A\times\delta_{SCS}$ while nrSSS format 1 and format 2 occupy a same transmission bandwidth of $BW_{SSS}=B\times\delta_{SCS}$. The constants A and B can be chosen such that $A\times\max\{\delta_{SCS}\}<B\times\min\{\delta_{SCS}\}$ or, alternatively, the sets $\{A\times\delta_{SCS}\}$ and $\{B\times\delta_{SCS}\}$ do not intersect with each other.

In case of example 3 or 6 from TABLE 4 where the transmission bandwidth of format 1 nrSSS different from that of format 2 nrSSS, nrPSS occupies a transmission bandwidth of $BW_{PSS}=A\times\delta_{SCS}$ while nrSSS format 1 and format 2 occupy transmission bandwidths of $BW_{SSS1}=B\times\delta_{SCS}$ and $BW_{SSS2}=C\times\delta_{SCS}$, respectively. The constants A, B, and C can be chosen such that $A\times\max\{\delta_{SCS}\}<B\times\min\{\delta_{SCS}\}$, $A\times\max\{\delta_{SCS}\}<C\times\min\{\delta_{SCS}\}$, and the sets $\{B\times\delta_{SCS}\}$ and $\{C\times\delta_{SCS}\}$ do not intersect with each other. Alternatively, the constants A, B, and C can simply be chosen such that the sets $\{A\times\delta_{SCS}\}$, $\{B\times\delta_{SCS}\}$, and $\{C\times\delta_{SCS}\}$ do not intersect with each other.

For the three example sub-embodiments in the previous paragraph, sub-carrier spacing can be detected when a UE attempts to acquire coarse timing and frequency offset upon receiving nrPSS. Having detected the sub-carrier spacing, the UE proceeds in demodulating nrSSS by detecting cell ID and nrSSS format (for instance, 1 or 2) from nrSSS. This detected format can be associated with a certain use case or numerology parameter.

Figure 11:
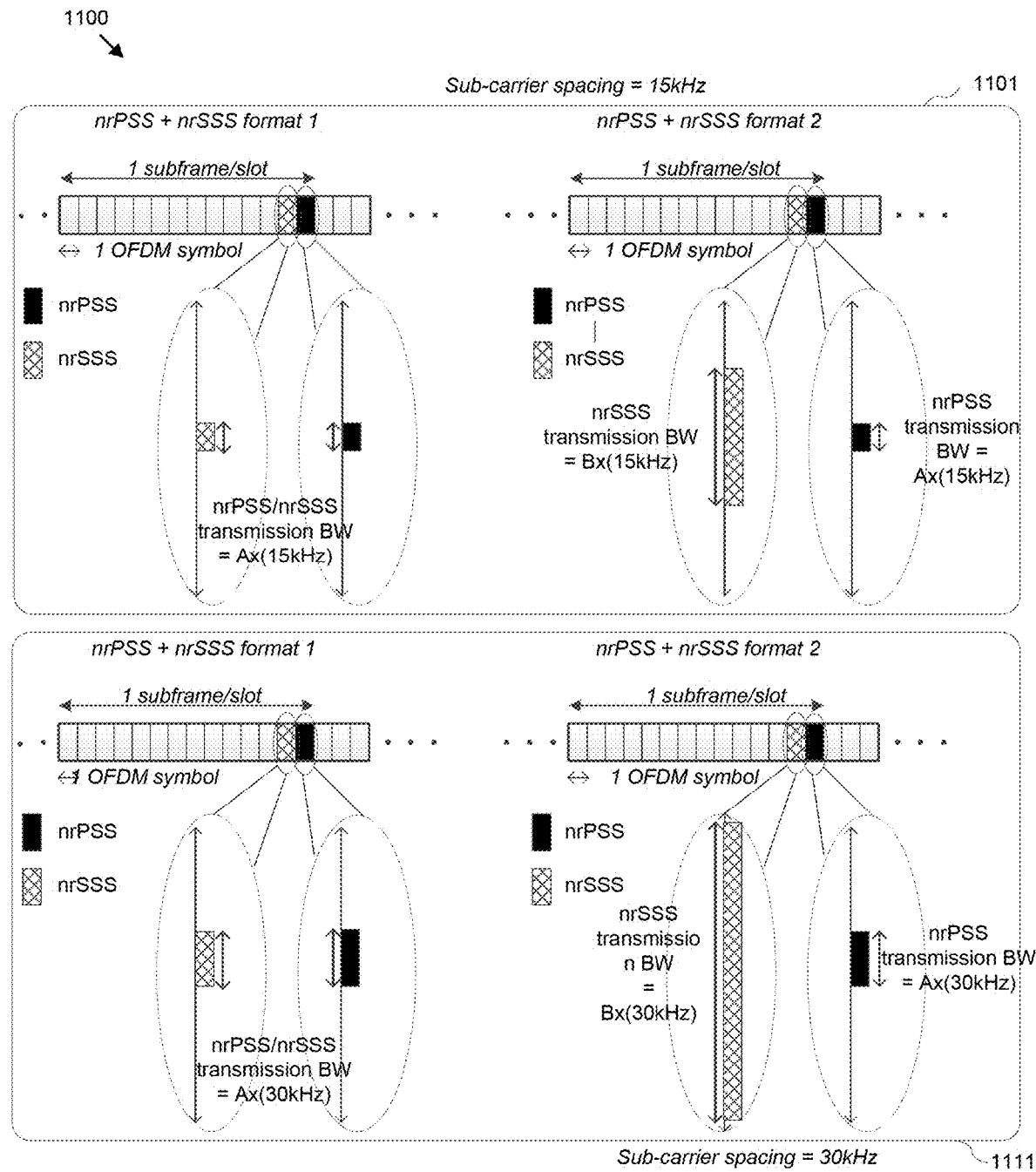
FIG. 11 illustrates an example several example multiplexing schemes for PSS, SSS, and PBCH in time and frequency domain according to an embodiment of the present disclosure.
Figure 12:
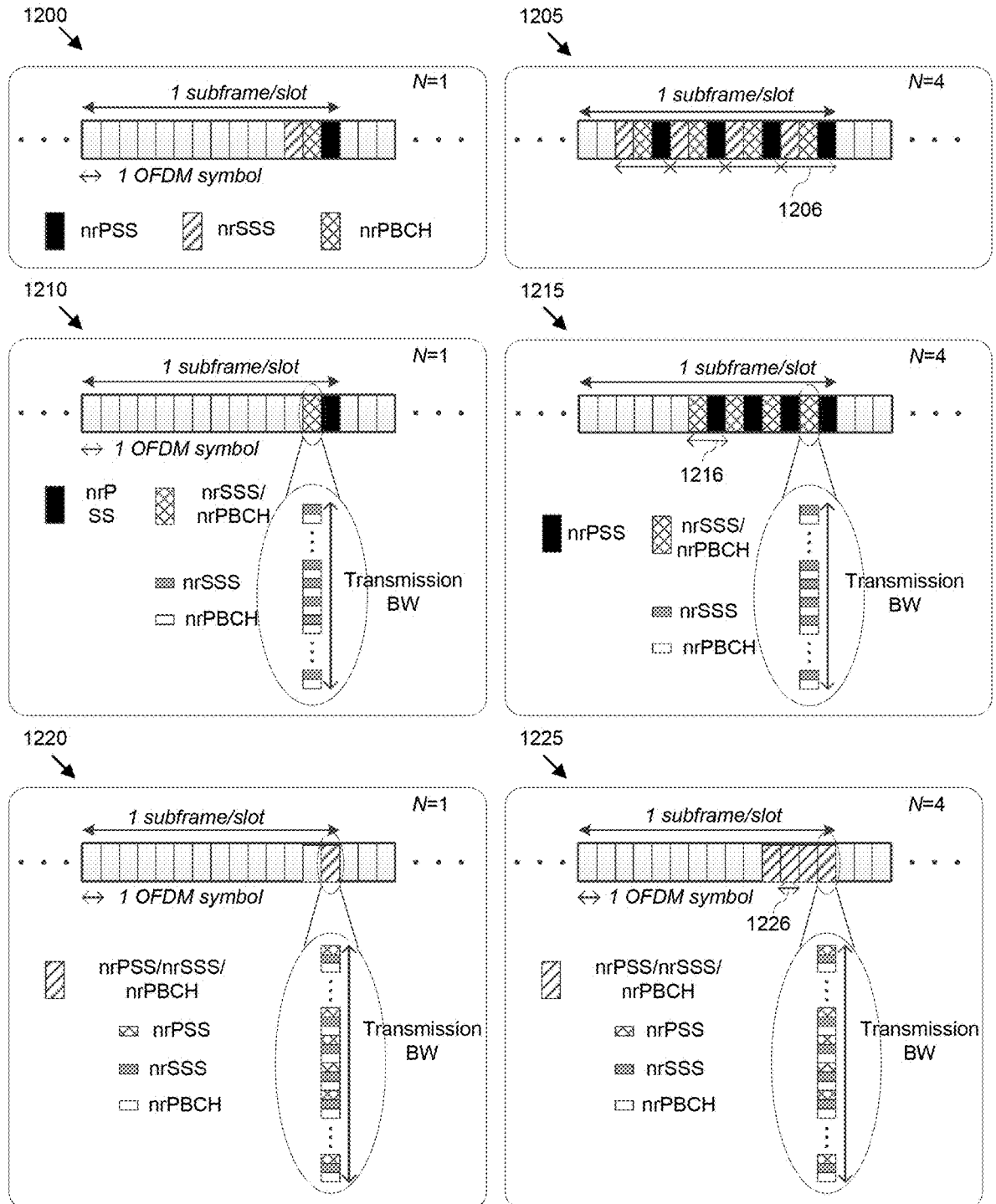
FIG. 12 illustrates an example several example multiplexing schemes for PSS, SSS, and PBCH in time and frequency domain according to an embodiment of the present disclosure.

The above sub-embodiment, in case of example 6, can be illustrated in embodiment 1100 of FIG. 11. Extension to other examples (such as 2, 3, or 5) can be straightforwardly inferred by those familiar with the art. In embodiment 1100, nrPSS and nrSSS are transmitted with variable sub-carrier spacing. Here, only two values of sub-carrier spacing are shown (1101 for 15 kHz, 1111 for 30 kHz) for illustrative purposes. Extension to other values of sub-carrier spacing (such as 60 kHz and 120 kHz) can be straightforwardly inferred by those skilled in the art. When nrPSS is multiplexed with nrSSS format 1, the transmission bandwidth of nrPSS and nrSSS is A×(15 kHz) and A×(30 kHz) for 15 kHz and 30 kHz sub-carrier spacing, respectively. When nrPSS is multiplexed with nrSSS format 2, the transmission bandwidth of nrPSS remains A×(15 kHz) and A×(30 kHz) for 15 kHz and 30 kHz sub-carrier spacing, respectively. On the other hand, the transmission bandwidth for nrSSS is B×(15 kHz) and B×(30 kHz) for 15 kHz and 30 kHz sub-carrier spacing, respectively.

Based on the above design, a UE is able to detect sub-carrier spacing and format information from nrPSS and nrSSS in addition to cell ID and coarse timing-frequency acquisition.

In another embodiment (IV.5) where $Q_{SSS}=2$ and $Q_{PSS}\geq1$, a variation to the examples in TABLE 2 can be introduced with transmitting format 1 nrSSS aperiodically with N=1. That is, format 1 nrSSS can be transmitted in any subframe/slot (or perhaps, with a few exceptions). Therefore, a UE can detect the presence of format 1 nrSSS as needed (analogous to LTE discovery signals). Format 2 nrSSS, on the other hand, is transmitted periodically with N>1. That is, format 2 nrSSS can be transmitted only in a predetermined set of subframes. The value of N is transparent to the UE.

For the fifth component (that is, embodiments for PBCH), several example embodiments can be described as follows.

A first issue on nrPBCH design is the transmission properties of nrPBCH. Since nrPBCH can be demodulated right after a UE detects nrSSS, it is expected that nrPBCH share at least some of the transmission properties of either nrPSS or nrSSS.

Therefore, in one embodiment (V.1), nrPBCH can share some of the transmission properties of either nrPSS or nrSSS. Such features include transmission bandwidth (as previously defined), frequency-domain location(s), sub-carrier spacing, and nrPBCH symbol duration (per transmission instance). In particular, if nrSSS transmission properties are different from nrPSS, nrPBCH can share the same transmission properties as nrSSS.

A second issue on nrPBCH design is a signal (or signals) that can be used as a reference signal for demodulating nrPBCH. For LTE, PBCH demodulation uses CRS (where the same number of antenna ports is used for PBCH and transmission mode 3 or 4). For NR, different reference signals (RSs) for measurement and demodulation (each possibly UE-specific) will most likely be used for data demodulation and CSI measurements. In addition, an always-on reference signal will most likely not available. Lastly, since a low channel coding rate (cf. effective coding rate of ~1/48 used for LTE) will be used for nrPBCH, any UE-transparent transmit diversity (that uses one antenna port for a given transmission instance) is expected to perform as well as full-diversity space-frequency block code (SFBC, such as the Alamouti code).

Therefore, in another embodiment (V.2), a UE can assume that nrPBCH is transmitted along one antenna port, and the one antenna port is common (shared) with at least one of nrPSS and nrSSS. This facilitates, for example, the use of UE-transparent transmit beamforming or beam sweeping to enhance the coverage of nrPSS, nrSSS, and/or nrPBCH.

In a sub-embodiment (V.2.1) where nrSSS and nrPBCH share the same antenna port (in addition to sharing the same transmission bandwidths and sub-carrier spacing), nrSSS can nrPBCH can be designed in such a way that nrSSS can be used for demodulating nrPBCH (that is, nrSSS can function as a demodulation RS for nrPBCH). This can be done regardless whether a special demodulation RS is allocated within the OFDM symbols where nrPBCH is transmitted. Several options can be described as follows and illustrated in FIG. 12. The values of N and the number of OFDM symbols per subframe/slot (7) used in these examples are for illustrative purposes.

In a first option (V.2.1.A, embodiment 1200 for N=1 and 1205 for N=4), the OFDM symbols carrying nrPSS, nrSSS, and nrPBCH are transmitted intermittently. When N>1 beams are used, this transmission pattern is repeated N times where a triplet of nrPSS-nrSSS-nrPBCH (such as 1206) share a same antenna port. Hence, a UE can assume that nrSSS and nrPBCH experience the same channel and transmit beamforming.

In a second option (V.2.1.B, embodiment 1210 for N=1 and 1215 for N=4), nrPSS is transmitted in one symbol while nrSSS and nrPBCH are transmitted in another symbol with nrSSS and nrPBCH interleaved across REs in frequency domain. When N>1 beams are used, this transmission pattern is repeated N times where a triplet of nrPSS-nrSSS/nrPBCH (such as 1216) share a same antenna port. Hence, a UE can assume that nrSSS and nrPBCH experience the same channel and transmit beamforming.

In a third option (V.2.1.C, embodiment 1220 for N=1 and 1225 for N=4), nrPSS, nrSSS, and nrPBCH are transmitted in one symbol as well as interleaved across REs in frequency domain. When N>1 beams are used, this transmission pattern is repeated N times where a triplet of nrPSS/nrSSS/nrPBCH (such as 1226) share a same antenna port. Hence, a UE can assume that nrSSS and nrPBCH experience the same channel and transmit beamforming.

Each of the three options can be used in combination with the multi-format nrPSS/nrSSS embodiments in component 2 (previous section). For example, with $Q_{SSS}$=2, embodiment 1200 can be used for format 1 nrSSS (with N=1) and embodiment 1215 can be used for format 2 nrSSS (with N=1). Alternatively, embodiment 1200 can be used for format 1 nrSSS (with N>1) and embodiment 1225 can be used for format 2 nrSSS (with N>1).

For any of the above embodiments, whenever DFT-S-OFDM is used, a single-carrier version of DFT-S-OFDM (single-carrier FDMA, SC-FDMA) where a UE is configured to transmit on a set of contiguous PRBs can be used.

For any of the above embodiments, whenever a single-stream transmission is used, either transmit diversity or a single-port transmission can be used.

The names for UL transmission channels or waveforms are example and can be substituted with other names or labels without changing the substance and/or function of this embodiment.

Figure 13:
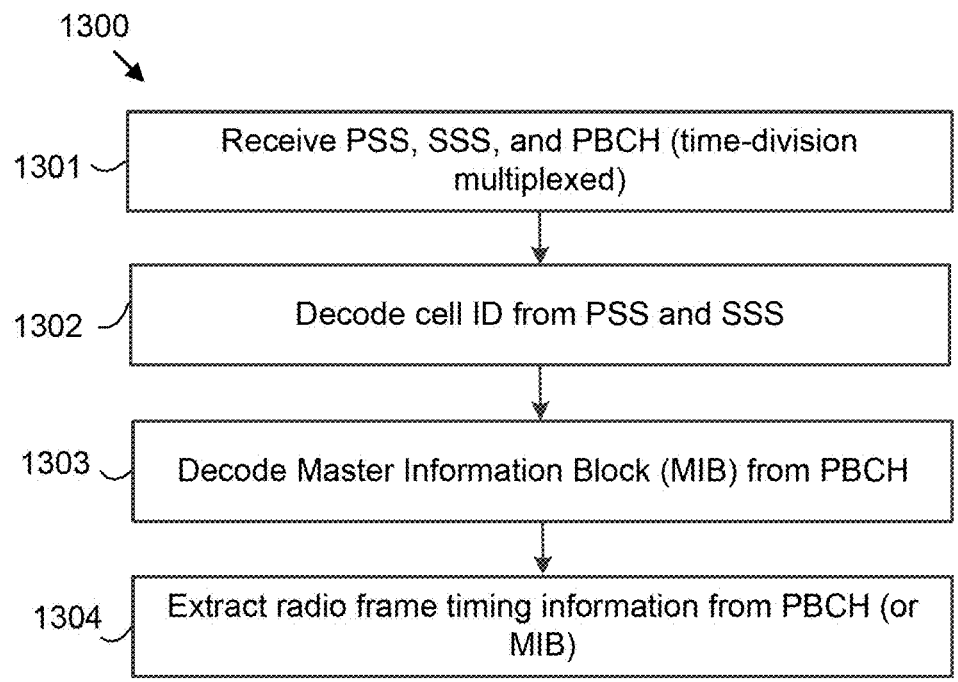
FIG. 13 illustrates a flowchart for an example method 1300 wherein a UE receives a primary synchronization signal (PSS), a secondary synchronization signal (SSS), and a primary broadcast channel (PBCH) according to an embodiment of the present disclosure.

FIG. 13 illustrates a flowchart for an example method 1300 wherein a UE receives a primary synchronization signal (PSS), a secondary synchronization signal (SSS), and a primary broadcast channel (PBCH) according to an embodiment of the present disclosure. For example, the method 900 can be performed by the UE 116.

The method 1300 begins with the UE receiving the PSS, the SSS, and the PBCH wherein the PSS, the SSS, and the PBCH are time-division multiplexed (step 1301). In addition, a same set of sequences are used for the PSS and the SSS for different carrier frequencies and different sub-carrier spacing values. From at least the PSS and the SSS, cell identification (cell ID) information is decoded (step 1302). Cell ID detection can be performed along with time and/or frequency acquisition (especially during initial access). The cell ID signifies the cell in which the UE is served. After decoding the cell ID, the UE proceeds with decoding a master information block (MIB) from the PBCH (step 1303). For different carrier frequencies and/or different sub-carrier spacing values, a same set of sequences (hence a same sequence length) are used for the PSS. Therefore, the number of sub-carriers used for PSS is the same for different carrier frequencies. The same holds for the SSS. The PSS, the SSS, and the PBCH can be transmitted using a same single antenna port. Therefore, the UE can assume that all the three signals share the same channel characteristics. Furthermore, timing information within each radio frame can be signaled via the PBCH or, more specifically, included in the MIB. Therefore, the UE extracts the radio frame timing information from the PBCH (or the MIB) (step 1304).

In one embodiment, the number of sub-carriers used for the PSS is the same as that for the SSS. In another embodiment, the number of sub-carriers used for the SSS is the same as that for the PBCH. In another embodiment, the number of sub-carriers used for the PSS is the same as that for the SSS, but smaller than that for the PBCH.

Figure 14:
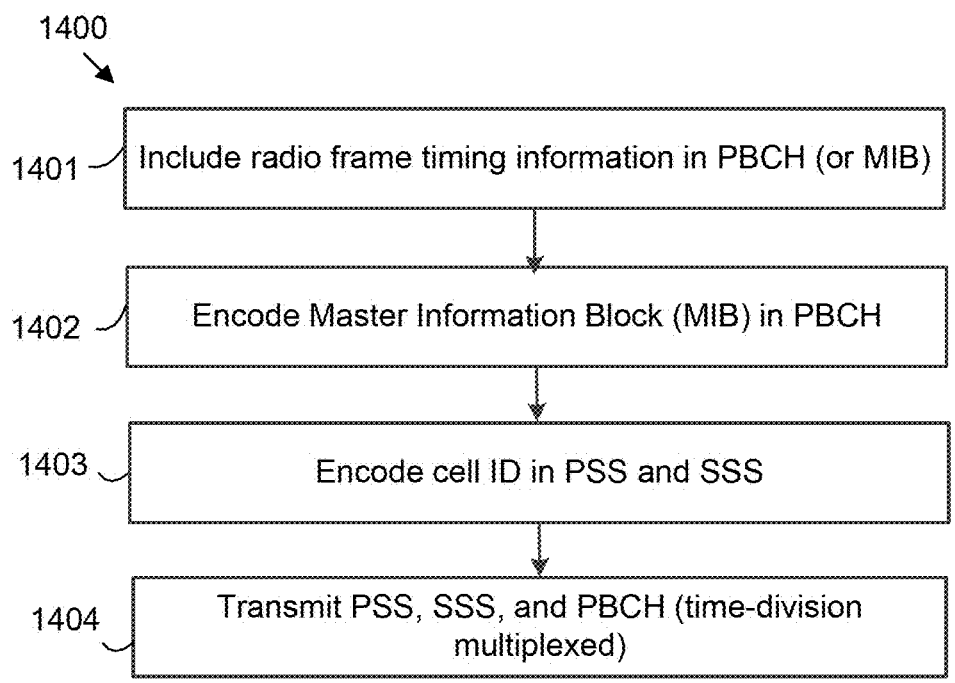
FIG. 14 illustrates a flowchart for an example method 1400 wherein a BS transmits a primary synchronization signal (PSS), a secondary synchronization signal (SSS), and a primary broadcast channel (PBCH) according to an embodiment of the present disclosure.

FIG. 14 illustrates a flowchart for an example method 1400 wherein a BS transmits a primary synchronization signal (PSS), a secondary synchronization signal (SSS), and a primary broadcast channel (PBCH) according to an embodiment of the present disclosure. For example, the method 1400 can be performed by the BS 102.

The method 1400 begins with the BS including radio timing information in PBCH or, more specifically in a Master Information Block (MIB) (step 1401). The MIB is encoded in the PBCH (step 1402) and cell identification (cell ID) information is encoded at least in the PSS and/or SSS. The cell ID signifies the cell in which a UE is served (step 1403). The BS then transmits the PSS, the SSS, and the PBCH in a time-division duplexing manner (step 1404).

For different carrier frequencies and/or different sub-carrier spacing values, a same set of sequences (hence a same sequence length) are used for the PSS. Therefore, the number of sub-carriers used for PSS is the same for different carrier frequencies. The same holds for the SSS. The PSS, the SSS, and the PBCH can be transmitted using a same single antenna port. Furthermore, timing information within each radio frame can be signaled via the PBCH or, more specifically, included in the MIB.

In one embodiment, the number of sub-carriers used for the PSS is the same as that for the SSS. In another embodiment, the number of sub-carriers used for the SSS is the same as that for the PBCH. In another embodiment, the number of sub-carriers used for the PSS is the same as that for the SSS, but smaller than that for the PBCH.

Although FIGS. 13 and 14 illustrate examples of methods for receiving configuration information and configuring a UE, respectively, various changes could be made to FIGS. 13 and 14. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
   a transceiver configured to receive a primary synchronization signal (PSS), a secondary synchronization signal (SSS), and a primary broadcast channel (PBCH); and
   a processor operably connected to the transceiver, the processor configured to decode cell identification information from at least the PSS and the SSS and to decode a master information block (MIB) from the PBCH;
   wherein the PSS, the SSS, and the PBCH are time-division multiplexed,
   wherein a same set of sequences are used for the PSS and the SSS regardless of carrier frequencies and sub-carrier spacing values for the PSS and the SSS,
   wherein timing information within each radio frame is signaled via the PBCH, and
   wherein the processor is further configured to use the timing information to determine a symbol timing of a received DL signal.

2. The UE of claim 1, wherein the PSS, the SSS, and the PBCH are transmitted using a same single antenna port.

3. The UE of claim 2, wherein a number of sub-carriers used for the PSS is the same as a number of sub-carriers used for the SSS.

4. The UE of claim 2, wherein a number of sub-carriers used for the SSS is the same as a number of sub-carriers used for the PBCH.

5. The UE of claim 2, wherein a number of sub-carriers used for the PSS is the same as a number of sub-carriers used for the SSS and smaller than a number of sub-carriers used for the PBCH.

6. The UE of claim 1, wherein the timing information is included in the MIB.

7. A base station (BS) comprising:
a processor configured to:
encode cell identification information in at least a primary synchronization signal (PSS) and a secondary synchronization signal (SSS);
encode a master information block (MIB) in a primary broadcast channel (PBCH); and
a transceiver operably connected to the processor, the transceiver configured to transmit the PSS, the SSS, and the PBCH;
wherein the PSS, the SSS, and the PBCH are time-division multiplexed,
wherein a same set of sequences are used for the PSS and the SSS regardless of carrier frequencies and sub-carrier spacing values for the PSS and the SSS,
wherein timing information within each radio frame is signaled via the PBCH, and
wherein the timing information is used to determine a symbol timing of a received DL signal.

8. The BS of claim 7, wherein the PSS, the SSS, and the PBCH are transmitted using a same single antenna port.

9. The BS of claim 7, wherein the timing information is included in the MIB.

10. The BS of claim 7, wherein a number of sub-carriers used for the PSS is the same as a number of sub-carriers used for the SSS.

11. The BS of claim 7, wherein a number of sub-carriers used for the PSS is the same as a number of sub-carriers used for the SSS and smaller than a number of sub-carriers used for the PBCH.

12. A method for operating a user equipment (UE), the method comprising:
receiving a primary synchronization signal (PSS), a secondary synchronization signal (SSS), and a primary broadcast channel (PBCH);
decoding cell identification information from at least the PSS and the SSS;
decoding a master information block (MIB) from the PBCH, wherein:
the PSS, the SSS, and the PBCH are time-division multiplexed,
a same set of sequences are used for the PSS and the SSS for different carrier frequencies and different sub-carrier spacing values, and
timing information within each radio frame is signaled via the PBCH; and
using the timing information to determine a symbol timing of a received DL signal.

13. The method of claim 12, wherein the PSS, the SSS, and the PBCH are transmitted using a same single antenna port.

14. The method of claim 13, wherein the timing information is included in the MIB.

15. The method of claim 13, wherein a number of sub-carriers used for the PSS is the same as a number of sub-carriers used for the SSS.

16. The method of claim 13, wherein a number of sub-carriers used for the SSS is the same as a number of sub-carriers used for the PBCH.

17. The method of claim 13, wherein a number of sub-carriers used for the PSS is the same as a number of sub-carriers used for the SSS and smaller than a number of sub-carriers used for the PBCH.

* * * * *